US010678943B2

(12) United States Patent
Aoki et al.

(10) Patent No.: US 10,678,943 B2
(45) Date of Patent: Jun. 9, 2020

(54) PERSONAL INFORMATION PLATFORMS

(71) Applicant: PAYPAL, INC., San Jose, CA (US)

(72) Inventors: Norihiro Edwin Aoki, Sunnyvale, CA (US); John Tsai, San Francisco, CA (US)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 16/266,476

(22) Filed: Feb. 4, 2019

(65) Prior Publication Data

US 2019/0347251 A1    Nov. 14, 2019

Related U.S. Application Data

(63) Continuation of application No. 14/980,414, filed on Dec. 28, 2015, now Pat. No. 10,198,464.

(51) Int. Cl.
| | |
|---|---|
| *G06F 21/62* | (2013.01) |
| *H04L 29/06* | (2006.01) |
| *G06F 16/23* | (2019.01) |
| *G06F 16/2457* | (2019.01) |
| *G06F 16/00* | (2019.01) |
| *G06F 21/60* | (2013.01) |

(52) U.S. Cl.
CPC .......... *G06F 21/6245* (2013.01); *G06F 21/62* (2013.01); *H04L 63/20* (2013.01); *G06F 16/00* (2019.01); *G06F 16/2358* (2019.01); *G06F 16/24573* (2019.01); *G06F 21/60* (2013.01)

(58) Field of Classification Search
CPC ...... G06F 21/60; G06F 21/62; G06F 21/6245; G06F 21/6263; G06F 21/6272; G06F 16/2358; G06F 16/24573; H04L 63/20
See application file for complete search history.

(56) References Cited

U.S. PATENT DOCUMENTS

| | | |
|---|---|---|
| 7,841,004 B1 | 11/2010 | Balducci et al. |
| 8,032,562 B2 | 10/2011 | Dunn et al. |
| 8,244,761 B1 | 8/2012 | Dickens et al. |
| 9,245,149 B1 * | 1/2016 | Chereshnev ........ G06F 21/6245 |
| 2003/0139144 A1 | 7/2003 | Kitajima et al. |
| 2007/0078684 A1 | 4/2007 | Dettinger et al. |
| 2007/0150315 A1 | 6/2007 | Bennett et al. |
| 2008/0270802 A1 * | 10/2008 | Ashley .................... G06F 21/10 |
| | | 713/184 |
| 2010/0010824 A1 | 1/2010 | Kim et al. |
| 2010/0281514 A1 | 11/2010 | Noh et al. |

(Continued)

*Primary Examiner* — Kristine L Kincaid
*Assistant Examiner* — Shaqueal D Wade
(74) *Attorney, Agent, or Firm* — Haynes and Boone LLP

(57) ABSTRACT

Various systems, mediums, and methods herein describe aspects of personal information platforms accessible with client devices over communication networks in data infrastructures. A system may determine data associated with a user. The system may determine a personal information platform (PIP) based on the data associated with the user, where the PIP is configured to identify a number of data types from the data associated with the user. The system may determine accesses for one or more entities to the number of data types based on one or more services provided by the one or more entities to the user. The system may cause a client device to display an indication of the PIP, where the indication provides the one or more accesses of the one or more entities.

20 Claims, 12 Drawing Sheets

(56) References Cited

U.S. PATENT DOCUMENTS

2015/0032619 A1 1/2015 Castinado et al.
2015/0101066 A1* 4/2015 Fram ...................... G06F 16/95
          726/28

* cited by examiner

PERSONAL INFORMATION PLATFORMS

CROSS-REFERENCE TO RELATED APPLICATIONS

This application is a continuation of and claims priority to U.S. patent application Ser. No. 14/980,414, filed Dec. 28, 2015, which is incorporated herein by reference in its entirety.

TECHNICAL FIELD

This disclosure generally relates to personal information platforms accessible with mobile devices over one or more networks of the data infrastructure.

BACKGROUND

With the advent of modern technology, users are increasingly distributing their information to a variety of sources. For example, users may conveniently use their mobile devices to provide information to a number of sources instantly. In some instances, the sources that receive the information may be related, possibly to share the information amongst a limited number of sources. Yet, in many instances, the sources may be unrelated, where some sources may further distribute the information over one or more other networks, possibly to derive a benefit from distributing the information.

In various respects, many users may face difficulties in tracking and/or managing their information, particularly after multiple distributions of their information to a variety of sources. For example, the user may have difficulty tracking and/or managing which sources have their information, such as their name, address, telephone number, and/or other types of information regarding the user. Thus, the user may be left without knowing which sources may have their information, what types of information these sources may have accumulated over longer periods of time, and/or how the data may be used by these sources, among other possible uncertainties.

As demonstrated in the scenarios above, there is much need for technological advancements to support the management of information with mobile technology and aspects of the data infrastructure.

Figure 1A:
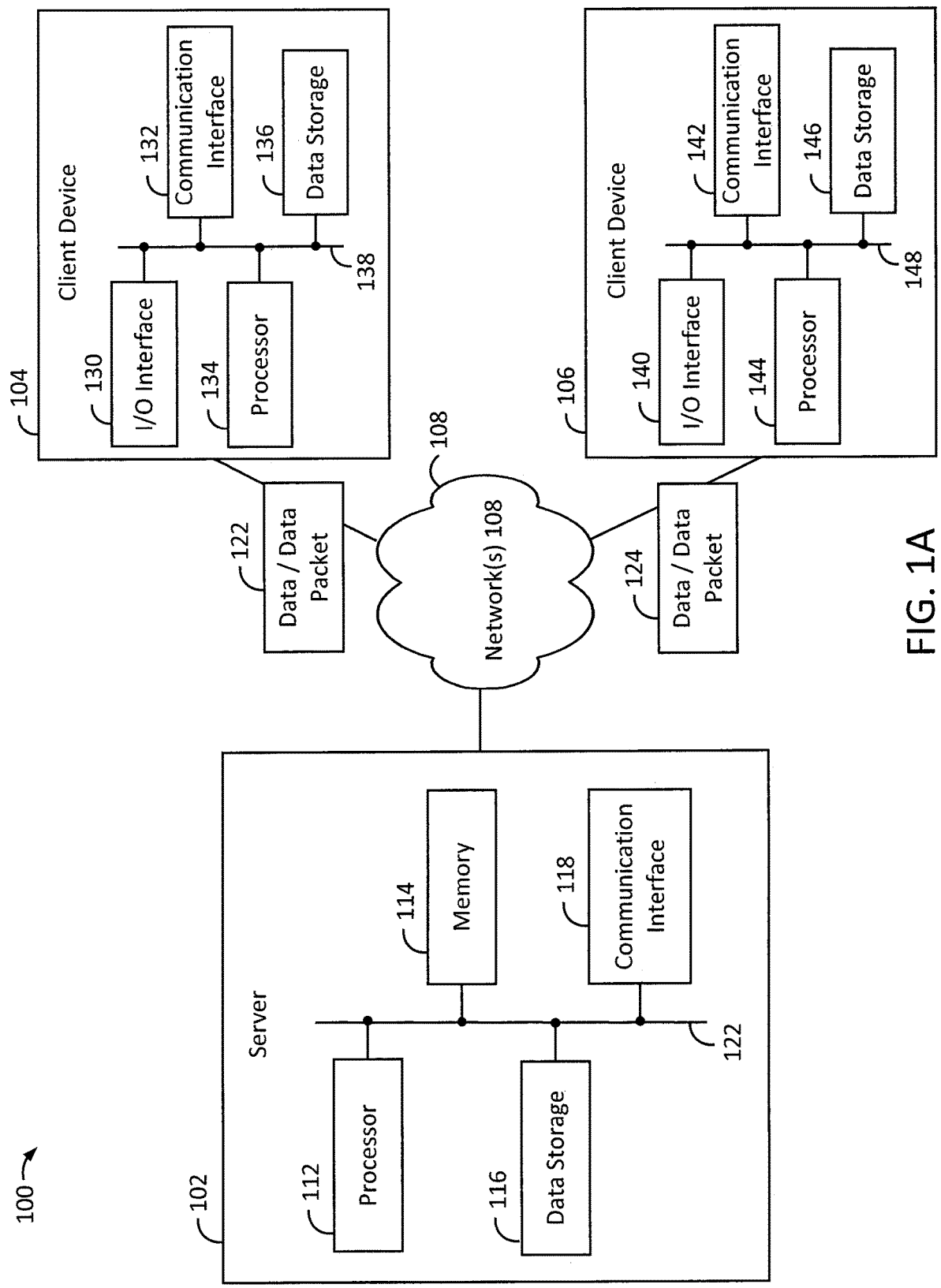
FIG. 1A is a block diagram of an exemplary system, according to an embodiment.

Embodiments of the present disclosure and their advantages may be understood by referring to the detailed description provided herein. It should be appreciated that reference numerals may be used to illustrate various elements and/or features provided in the figures. Further, the figures may illustrate various examples for purposes of illustration and explanation related to the embodiments of the present disclosure and not for purposes of any limitation.

DETAILED DESCRIPTION

Considering the various scenarios above, a user may wish to understand various details regarding their information. As noted above, users may wish to know how their information may be used by multiple sources, possibly sources unidentified by the user. Yet further, the users may further speculate as to how such uses of the information may or may not affect the user. As such, there is much need for users being able to resolve such uncertainties. For example, the users may wish to view the accessibility of their information, the scope the accessibility to various sources, and/or the security of their information from such sources, possibly based on multiple distributions of the information.

As described in various embodiments provided herein, a personal information platform (PIP) may be a mechanism to resolve possible issues and/or uncertainties described above. In particular, the PIP may be displayed on a smartphone that enables the user to view which entities have access to their information, the scope of the accessibility, and/or the security of their data, amongst various other aspects of their data described herein. For example, the PIP may take the form of a data pipeline, possibly viewable on the user's smartphone. As such, the smartphone may display the PIP controlling the user's data that goes into the data pipeline. Further, the smartphone may display the PIP controlling the user's data that comes out of the data pipeline, thereby controlling the accesses of various entities to the user's data. Notably, the PIP may take the form of various other devices, tools, and/or instruments, among other possibilities.

In practice, for example, the PIP controls which particular entities may have access to the user's data coming out of the data pipeline, possibly entities selected from numerous entities interested in the user's data. For instance, the PIP may determine that a particular entity, such as the user's credit card company, requires the user's zip code such that the user is able to verify purchases at a gas station often visited for purchasing gas. As such, the PIP may provide the credit card company with the user's zip code. Yet, the PIP may set a number of rules and/or restriction on the credit card company such that the zip code may not be used for purposes other than facilitating the user purchase gas. For example, the PIP may set rules and/or restrictions preventing the transfer of the user's data to other entities without the user's permission.

As illustrated in the scenario above, the PIP may determine the types of data required by a given entity to adequately provide services to the user. In another example, the PIP may receive a request from the credit card company for the user's age. Yet, the PIP may determine that the credit card company may adequately provide the services utilized by the user without having access to the user's age. In particular, the services provided by the user's credit card may not have a functional relationship with the user's age. As such, the PIP may deny the credit card company's request for the user's age, possibly to help preserve the privacy of the user.

Yet further, the PIP may control the extent, the degree, and/or the level of accesses entities may have to the user's data. As noted, for example, the PIP may set a number rules and/or restrictions on entities that are given accesses to the user's data. In yet another example, a user may download a mobile application or an "app" with their smartphone. The PIP may identify the app requests nine different or separate accesses to the user's data, possibly reflecting the average number of requests apps may generally request from a given user. For example, the app identified by the PIP may request the user's first name, last name, gender, birthday, email address, home address, phone number, password, and/or access to the user's smartphone locations.

In such instances, the PIP may deny seven out of the nine requests, such as the requests for the user's last name, gender, and/or birthday, among other aspects of the user's data described above. For example, the PIP may deny the seven requests based on determining the app may perform adequately for the user without the data requested. Further, in some instances, the PIP may grant two of the nine accesses, such as the user's first name and the user's smartphone location, possibly based on the app requiring the two accesses to function properly or as desired by the user. Notably, the PIP may provide various notifications to the user's smartphone regarding the app that requests the user's data. As such, the user may accept or deny the requests accordingly.

In some embodiments, a number of user inputs may adjust the control of the PIP over various accesses to the user's data. For example, the user may create, modify, and/or remove the rules and/or restrictions described above on the accesses given to the user's data. Further, in some instances, the user's inputs may configure the PIP to give an entity the data it requires to perform its services properly and/or seamlessly for the user. For example, the user may configure the PIP to give a visual discovery tool the data it requires to identify ideas related to the user's interests. Thus, the PIP may search, identify, and provide the tool with data indicating the user's interests, curiosities, and/or attractions, such as the user's browse data, search histories, and/or click data, among other forms of data identified by the PIP to facilitate the tool in providing the services for the user.

Notably, the PIP may be built in a number of different formats and/or languages configurable by the user. In practice, considering the zip code scenarios above, the user may configure the PIP to accept requests for the user's zip code from entities that have one or more certifications, guarantees, and/or qualifications, such a trustee certification. In another example, the user may configure the PIP to accept requests for the user's smartphone location to entities that previously provided services for the user and/or previously interacted with the user, among other possibilities.

In some embodiments, a report card may be provided to the user regarding the user's PIP. For example, the report card may provide the user with one or more views, insights, and/or assessments of the user's PIP. For example, the user may periodically receive a notification on the user's smartphone, such as on an annually and/or a monthly basis. The report card may indicate various entities with access to the user's data, the number of ways that the data may be used by the entities, and/or any new distributions of the user's data to other entities. The report card may also provide a number of graphical representations, such as charts, diagrams, and/or tables, possibly illustrating the number of times the entities accessed, used, and/or distributed the user's data. Further, based on the number of times the entities may have used the data, the graphical representations may illustrate whether the entities require the user's data to adequately perform services for the user. In various respects, the report card may help the user establish a sense of trust with the entities that have the user's data, particularly if the user is able to view how the entities access, utilize, and/or distribute the user's data. As such, based on the level of trust established, the report card may lead to users being willing to provide the entities with more of the user's data.

In some embodiments, the user's data may be an asset. For example, the user's search history data, browse data, click stream, and/or selection data, among other forms of data (e.g., "like" indices) may be valuable to various online entities. In additional examples, the user's email address, telephone, and/or mailing address may be valuable to multiple advertisement entities. In some instances, the user's data may have an intrinsic value to the user and/or an extrinsic value to various entities. As such, the user's data may be associated with a variety of values, possibly a combination of such values determined in marketable settings.

In some embodiments, the PIP may enable an arbitrage mechanism with the user's data, possibly based on one or more values assessed with the user's data as described above. In various respects, the PIP may include a technological platform that models the value of the user's data or possibly specific entries in the user's data. For example, the PIP may assess values and/or monetize the user's data entries based on one or more arbitrage models. In particular, considering the scenarios above where the PIP takes the form of a data pipeline, the PIP may determine values on the user's data going into the pipeline and extract fees from entities that receive the user's data coming out of the pipeline, possibly in accordance with the values determined on the user's data. Yet further, the PIP may extract fees based on usage, such as the number of times the entities use the data. Thus, the PIP may further control the user's data going into the pipeline and the data coming out of the pipeline based on such arbitrage models of the user's data.

In practice, for example, the user may assess a value to entries of the user's data, possibly referred to an intrinsic value. For instance, the user may assess a lower value to the user's demographic data, gender, and/or age. Yet, one or more online entities may also assess a value on such entries of the user's data, possibly referred to as an extrinsic value. For example, the online entities may value user's demographic data, gender, and/or age to facilitate their targeted services and/or advertisements. As such, the extrinsic value to the online entities may be higher than the intrinsic value of the data to the user. In such instances, the PIP may provide the online entities with the user's data in exchange for fees coming from the online entities, possibly based on the arbitrage models described above computing the variable intrinsic and/or extrinsic values, among other market-driven values. These fees may then be returned to the user. As noted, the PIP may also place various rules and/or restrictions on the user's data to prevent unpermitted distribution of the data to one or more other second entities.

Referring back to the report card provided to the user, the information in the report card may enable the user to view the user's balance from various fees extracted based on the one or more arbitration models described above. Further, the report card may also provide assessments of risk, privacy, and/or levels of trust associated with the entities that have the user's data, possibly based on providing the user's data transferred in exchange for the extracted fees. In some instances, each portion of the user's data, e.g., demographic data, gender, and/or age, may be represented with a trust metric based on the entities with access to the data and a value indicator based on the one or more arbitration models.

In various embodiments, the PIP may enable the user to customize and/or balance the user's controls over their data. For example, more conservative users may wish to have stronger controls over their data, possibly managing their data without participating in the arbitration exchanges for data or participating less in the arbitration exchanges. Yet, more experimental users may relax their controls over their data, possibly participating more in the arbitration exchanges to receive more fees from the entities. In another view, the PIP may enable entities to customize and/or balance their approaches to obtaining data from users. For example, more conservative entities may not participate in the arbitration exchanges to receive the user's data. In some instances, such entities may already have a substantial amount of the user's data, possibly to adequately provide services to users. Yet, more aggressive entities may participate regularly in the arbitration exchanges to receive the user's data. For example, such entities may generally lack data from users such that their services are may or may not adequately meet user requirements.

It should be noted that users are increasingly becoming more wary, cautious, and/or suspicious of entities deriving benefits from possessing their data. As such, user demands for the personal information platform (PIP) may be expected, particularly to resolve such trust-related issues. Yet further, an entity providing services for a user may wish to continuously maintain or increase the user's trust in the entity's practices with handling user's data. As such, the entities may wish to implement the PIP as well. In addition, as users recognize an increasing number of entities supporting PIPs for users, there may be a growing suspicion of entities that opt not to support the PIPs for users. Thus, it may be expected that more, if not all entities, will wish to participate in the implementation of the PIP for their users.

In various circumstances, the example embodiments described herein may resolve various challenges with managing personal information with mobile devices over communication networks and data infrastructures. As such, the example embodiments described herein may resolve problems that did not exist before the availability of the computer networks and/or the Internet. In particular, such embodiments may address problems specific to managing personal information utilizing mobile devices, computer networks, and/or the Internet. Various such embodiments may provide solutions that are technical nature and/or rooted managing personal information over computer networks and/or the Internet. Further, such embodiments may provide unconventional steps confined to one or more particular useful applications related to a given user controlling their personal information among numerous entities.

FIG. 1A is a block diagram of an exemplary system 100, according to an embodiment. The system 100, possibly referred to as the data infrastructure 100, may be configured to transfer data over one or more communication networks 108. In particular, the system 100 may include the server 102, possibly referred to as the server system 102. The server 102 may be configured to perform operations of a service provider, such as PayPal, Inc. of San Jose, Calif., USA. Further, the system 100 may also include client device 104 and/or the client device 106 operated by their respective users. In practice, the server 102 and the client devices 104 and/or 106 may be configured to communicate over the one or more communication networks 108.

The system 100 may operate with more or less than the computing devices shown in FIG. 1A, where each device may be configured to communicate over one or more communication networks 108, possibly to transfer data accordingly. The one or more communication networks 108 may also include a packet-switched network configured to provide digital networking communications, possibly to exchange data of various forms, content, type, and/or structure. The one or more communication networks 108 may include a data network such as a private network, a local area network, and/or a wide area network. In some instances, the one or more communication networks 108 may include a communications network such as a telecommunications network and/or a cellular network with one or more base stations, among other possible networks.

The data/data packets 122 and/or 124 may be transferrable using communication protocols such as packet layer protocols, packet ensemble protocols, and/or network layer protocols. For example, the data/data packets 122 and/or 124 may be transferrable using transmission control protocols and/or internet protocols (TCP/IP). In various embodiments, each of the data/data packets 122 and 124 may be assembled or disassembled into larger or smaller packets of varying sizes, such as sizes from 1,000 to 1,500 bytes, for example, among other possible sizes. As such, data/data packets 122 and/or 124 may be transferrable over the one or more networks 108 and to various locations in the data infrastructure 100.

In some embodiments, the server 102 may take a variety of forms. The server 102 may be an enterprise server, possibly configured with one or more operating systems to facilitate the scalability of the data infrastructure 100. For example, the server 102 may configured with a Unix-based operating system to integrate with a growing number of other servers, client devices 104 and/or 106, and one or more networks 108 over the system architecture 100. The server 102 may further facilitate workloads associated with numerous data transfers in view of an increasing number of personal information platforms implemented for users.

In some embodiments, the server 102 may include multiple components, such as a hardware processor 112, a non-transitory memory 114, a non-transitory data storage 116, and/or a communication interface component 118, among other possible components, any of which may be communicatively linked via a system bus, network, or other connection mechanism 120. The hardware processor 112 may take the form of a multi-purpose processor, a microprocessor, a special purpose processor, a digital signal processor (DSP) and/or other types of processing components. For example, the processor 112 may include an application specific integrated circuit (ASIC), a programmable system-on-chip (SOC), and/or a field-programmable gate array (FPGA) to process, read, and/or write data for an increasing number of personal information platforms for numerous users. In particular, the processor 112 may include a variable-bit (e.g., 64-bit) processor architecture specifically configured to facilitate the scalability of the increasing number of PIPs. As such, the one or more processors 112 may execute varying instructions sets (e.g., simplified and complex instructions sets) with fewer cycles per instruction than other conventional general-purpose processors to improve the performance of the server 102 for purposes of mass scalability and/or accommodation of growth.

In practice, for example, the hardware processor 112 may be configured to parse the one or more data packets 122. As such, the hardware processor 112 may identify one or more types of data, possibly including particular data entries, transferred with the client device 104. The processor 112 may also create one or more PIPs for a user of the client device 104 based on the one or more types of data or data entries transferred. As such, the processor 112 may identify various types of data associated with the user of the client device 104 based on the data packets 122 transferred. In some instances, the processor 112 may build and/or construct one or more PIPs for the user as additional types of data or data entries are recognized. As such, the processor 112 may utilize the PIP to determine which entities may have access to the types of data recognized, possibly based on the services the entities provide for the user. For example, considering the visual discovery tool scenario described above, the processor 112 may provide a foundation for the PIP to recognize the tool as an entity to have access to various types of data of the user. In some instances, the tool may be granted access to specific types of data to function and/or operate in one or more methods, possibly as specified by the user.

The non-transitory memory component 114 and/or the data storage 116 may include one or more volatile, non-volatile, and/or replaceable data storage components, such as a magnetic, optical, and/or flash storage that may be integrated in whole or in part with the hardware processor 112. Further, the memory component 114 may include a number of instructions and/or instruction sets. The processing component 112 may be coupled to the memory component 114 and configured to read the instructions to cause the server 102 to perform operations, such as those described in this disclosure, illustrated by the accompanying figures, and/or otherwise contemplated herein. Notably, the data storage 116 may be configured to store numerous data entries for one or more PIPs, possibly including entries that may be accessed often by the client devices 104 and/or 106.

The communication interface component 118 may take a variety of forms and may be configured to allow the server 102 to communicate with one or more devices, such as the client devices 104 and/or 106. For example, the communication interface component 118 may include a transceiver that enables the server 102 to communicate with the client devices 104 and/or 106 via the one or more communication networks 108. Further, the communication interface component 118 may include a wired interface, such as an Ethernet interface, to communicate with the client devices 104 and/or 106. Yet further, the communication interface component 118 may include a wireless interface, such as a cellular interface, a Global System for Mobile Communications (GSM) interface, a Code Division Multiple Access (CDMA) interface, and/or a Time Division Multiple Access (TDMA) interface, among other possibilities. In addition, the communication interface 118 may include a wireless local area network interface such as a WI-FI interface configured to communicate with a number of different protocols. As such, the communication interface 118 may include a wireless interface configured to transfer data over short distances utilizing short-wavelength radio waves in approximately the 2.4 to 2.485 GHz range. In some instances, the communication interface 118 may send/receive data or data packets 122 and/or 124 to/from client devices 104 and/or 106.

The client devices 104 and 106 may also be configured to perform a variety of operations such as those described in this disclosure, illustrated by the accompanying figures, and/or otherwise contemplated herein. For example, the client devices 104 and 106 may be configured to transfer data packets 122 and/or 124 with the server 102, respectively, such that the server 102 may manage one or more PIPs for respective users of the client device 104 and/or 106. The server 102 may manage multiple PIPs based on various types of data transferred with the data packets 122 and/or 124. For example, the server 102 may manage one or more PIPs based on the data packets 122 and/or 124 including location data, such as Global Positioning System (GPS) data and/or GPS coordinate data, triangulation data, beacon data, WI-FI data, peer data, social media data, sensor data, movement data, temperature data, and/or other types of data described or contemplated herein.

In some embodiments, the client devices 104 and 106 may include or take the form of a smartphone system, a personal computer (PC) such as a laptop device, a tablet computer device, a wearable computer device, a head-mountable display (HMD) device, a smart watch device, and/or other types of computing devices configured to transfer data. The client devices 104 and 106 may include various components, including, for example, input/output (I/O) interfaces 130 and 140, communication interfaces 132 and 142, hardware processors 134 and 144, and non-transitory data storages 136 and 146, respectively, all of which may be communicatively linked with each other via a system bus, network, or other connection mechanisms 138 and 148, respectively.

The I/O interfaces 130 and 140 may be configured to receive inputs from and provide outputs to respective users of the client devices 104 and 106. For example, the I/O interface 130 may include a display that provides a graphical user interface (GUI) configured to receive an input from a user to create, configure, and/or modify one or more personal information platforms. Thus, the I/O interfaces 130 and 140 may include displays configured to receive inputs and/or other input hardware with tangible surfaces, such as touchscreens with touch sensitive sensors and/or proximity sensors. The I/O interfaces 130 and 140 may also include a microphone configured to receive voice commands, a computer mouse, a keyboard, and/or other hardware to facilitate input mechanisms. In addition, I/O interfaces 130 and 140 may include output hardware such as one or more sound speakers, other audio output mechanisms, haptic feedback systems, and/or other hardware components.

In some embodiments, communication interfaces 132 and 142 may include or take a variety of forms. For example, communication interfaces 132 and 142 may be configured to allow client devices 104 and 106, respectively, to communicate with one or more devices according to a number of protocols described and/or contemplated herein. For instance, communication interfaces 132 and 142 may be configured to allow client devices 104 and 106, respectively, to communicate with the server 102 via the one or more communication networks 108. The hardware processors 134 and 144 may include one or more multi-purpose processors, microprocessors, special purpose processors, digital signal processors (DSP), application specific integrated circuits (ASIC), programmable system-on-chips (SOC), field-programmable gate arrays (FPGA), and/or other types of processing components.

The non-transitory data storages 136 and 146 may include one or more volatile or non-volatile data storages, removable or non-removable data storages, and/or a combination of such data storages that may be integrated in whole or in part with the hardware processors 134 and 144, respectively. Further, data storages 136 and 146 may include non-transitory memories that store instructions and/or instructions sets. Yet further, the processors 134 and 144 may be coupled to the data storages 136 and 146, respectively, and configured to read the instructions from the non-transitory memories to cause the client devices 104 and 106 to perform operations, respectively, such as those described in this disclosure, illustrated by the accompanying figures, and/or otherwise contemplated herein.

Figure 1B:
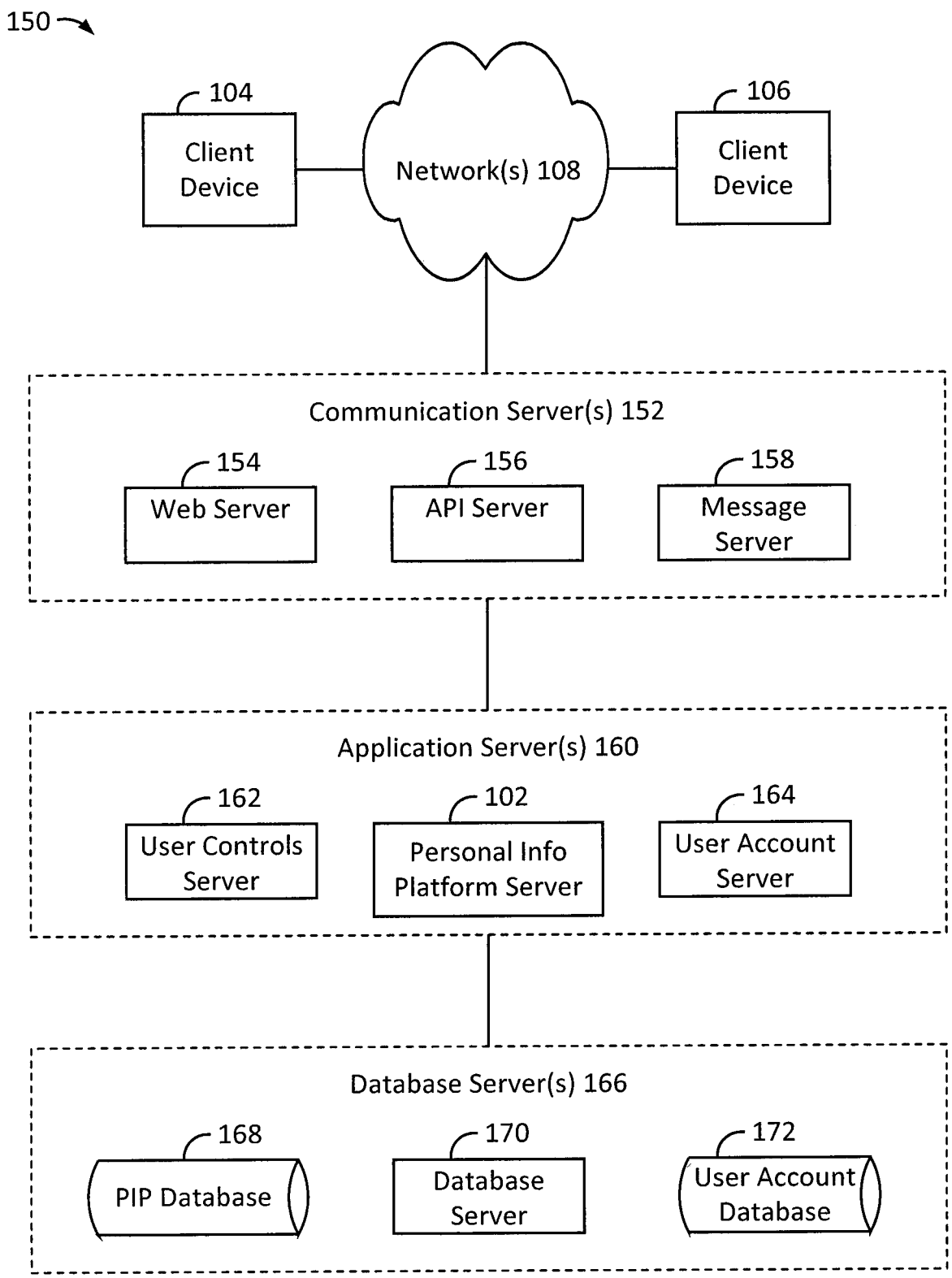
FIG. 1B is a block diagram of another exemplary system, according to an embodiment.

FIG. 1B is a block diagram of another exemplary system, according to an embodiment. As shown, the system 150, possibly referred to as the data infrastructure 150, may be configured to transfer the data packets 122 and/or 124 as described above in relation to data infrastructure 100 in FIG. 1A. For example, the system 150 includes the server 102, shown as a personal information platform server 102. Further, the system 150 includes the client devices 104 and 106, and also the one or more networks 108. As illustrated, the data infrastructure 150 may include one or more communication servers 152, one or more application servers 160, and/or one or more database servers 166.

In some embodiments, the one or more communication servers 152 may include a web server 154, an application programming interface (API) server 156, and/or a message server 158. The web server 154 may, be configured to communicate with the client devices 104 and/or 106 over the one or more networks 108. The web server 154 may host numerous web browsers, web sites, web-based applications, software applications, virtual machines, and/or other possibilities. The API server 156 may be configured to communicate with various applications or mobile apps of the client devices 104 and/or 106, including service provider applications configured to communicate with API-based communications and/or protocols over the one or more networks 108. The message server 158 may be configured to communicate with the client devices 104 and/or 106 over the one or more networks 108 with various transmissions, communication mediums, and/or related applications such as e-mail, local area network (LAN) messaging, and/or short message service (SMS), among various other possibilities. Notably, any two or more of the servers 154, 156, and/or 158 may be combined and the combined server may be configured to perform one or more operations of the servers 154, 156, and/or 158 as described and/or contemplated herein.

In some embodiments, the one or more application servers 160 may include the personal information platform (PIP) server 102, the user controls server 162, and/or the user account server 164. The PIP server 102 may maintain, manage, and/or support numerous personal information platforms for one or more users as described herein. The user controls server 162 may maintain, manage, and/or support various user controls, configurations, and/or settings associated with the respective PIPs for the one or more users. The user account server 164 may maintain, manage, and/or support numerous user accounts for the one or more users, such as email accounts, networking accounts, and/or payment provider accounts, among other types of accounts described and/or contemplated herein.

In some embodiments, the one or more database servers 166 may include the database server 170, the personal information platform database 168, and/or the user account database 172. The database server 170 may communicate with the PIP server 102 to facilitate the storage of data, data types, and/or data entries of the PIPs in the personal information platform database 168. The database server 170 may also communicate with the user account server 164 to facilitate the storage of user account data in the user account database 172. In some embodiments, the data stored with the PIP database 168 may correspond to the data stored with the user account database 172. As such, the database server 170 may include one or more search indexes with varying complexities to minimize replicated data entries stored in the PIP database 168 and the user account database 172.

In practice, for example, a user operating the client device 104 may send a request over the one or more networks 108 to create a personal information platform. Referring back to FIG. 1A, the request may be embedded with the data/data packet 122. As such, the request may be transmitted to the one or more communications servers 152 to request a connection with the PIP server 102. For example, the web server 154, possibly referred to as a domain name server (DNS) in this scenario, may search and identify one or more internet protocol (IP) addresses of the PIP server 102, possibly taking the form of 192.168.102.100. As such, a connection with the client device 104 and the personal information platform server 102 may be established to create the personal information platform. Notably, the client device 104 may establish such connections with the PIP server 102 with or without user inputs, possibly to generate, build, and/or modify the personal information platform in real-time, possibly unbeknownst to the user of the client device 104.

In some embodiments, the system 150 may be referred to as a personal information platform (PIP) system 150. In particular, the PIP system 150 may include the non-transitory memory 114 for storing instructions. The PIP system 150 may also include the one or more of hardware processors 112 coupled to the non-transitory memory 114 and configured to read the instructions to cause the system 150 to perform operations. The PIP system 150 may create one or more PIPs for a user with or without the user's inputs, where each PIP identifies and/or recognizes one or more types of data associated with the user. The system 150 may recognize various forms of data natively stored in the client device 104, possibly based on the connection protocols between the client device 104 and the PIP server 102 described above.

It can be appreciated that the server 102 and the client devices 104 and/or 106 in FIGS. 1A and 1B may be deployed in various other ways. For example, the operations performed by the server 102 and/or the client devices 104 and 106 may be performed by a greater or a fewer number of devices. Further, the operations performed by two or more devices, such as the servers 102, 162, and/or 164, may be combined and performed by a single device, such as the server 102. Yet further, the operations performed by a single device, such as the server 102, may be separated or distributed among the server 102, the user controls server 162, the user account server 164, and/or the database server 170, among other possible devices. In addition, the client devices 104 and/or 106 may be operated and/or maintained by different users such that each client device 104 and/or 106 may be associated with one or more PIPs.

Notably, one or more user accounts maintained by the user account server 164 may be displayed on the client device 104, possibly through the I/O interface 130 described above. As such, a user account may be displayed on a smartphone system to provide the user with access to the account. In some instances, the user may access the one or more accounts through the user's personal information platform. As such, the user may utilize the user's PIP as a portal into the one or more user accounts.

In some embodiments, an account, possibly referred to a user account, may take a number of different forms. For example, an account may be an e-mail account, a networking account, a professional and/or a social networking account, a smartphone account, a music or music playlist accounts, and/or a video streaming account, among other possible accounts. Further, an account may include a compilation of data associated with a given user. For example, an account for a particular user may include data related to the user and/or the user's interests, such as an account associated with the discovery tool described above. Some examples of accounts may include accounts with service providers described above, e-commerce accounts, and/or accounts with funds, balances, fund transfers, transactions, and/or checkouts of the user, among other possibilities.

In some embodiments, a user account may be created for one or more users. For example, an account may be a family account created for multiple family members, where each member may have access to the account. In some instances, the account may be a corporate account, where employees, staff, worker personnel, and/or contractors, among other individuals may have access to the corporate account. Yet further, it should be noted that a user, as described herein, may be a number of individuals or possibly a robot, a robotic system, a computing device, a computing system, and/or another form of technology capable of transferring data associated with the account. The user may be required to provide a login, a password, a code, an encryption key, authentication data, and/or other types of data to be permitted to access the account.

In some embodiments, a PIP for a given user may represent the user and/or provide an interface to multiple accounts, service providers, and/or applications, among other possibilities. For example, the PIP may represent the user for the user's e-mail accounts, networking and/or social networking accounts, and/or smartphone accounts, as well as websites, applications, and/or other services. As such, a user could opt to use the PIP as a multi-purpose account for performing various operations.

Figure 2A:
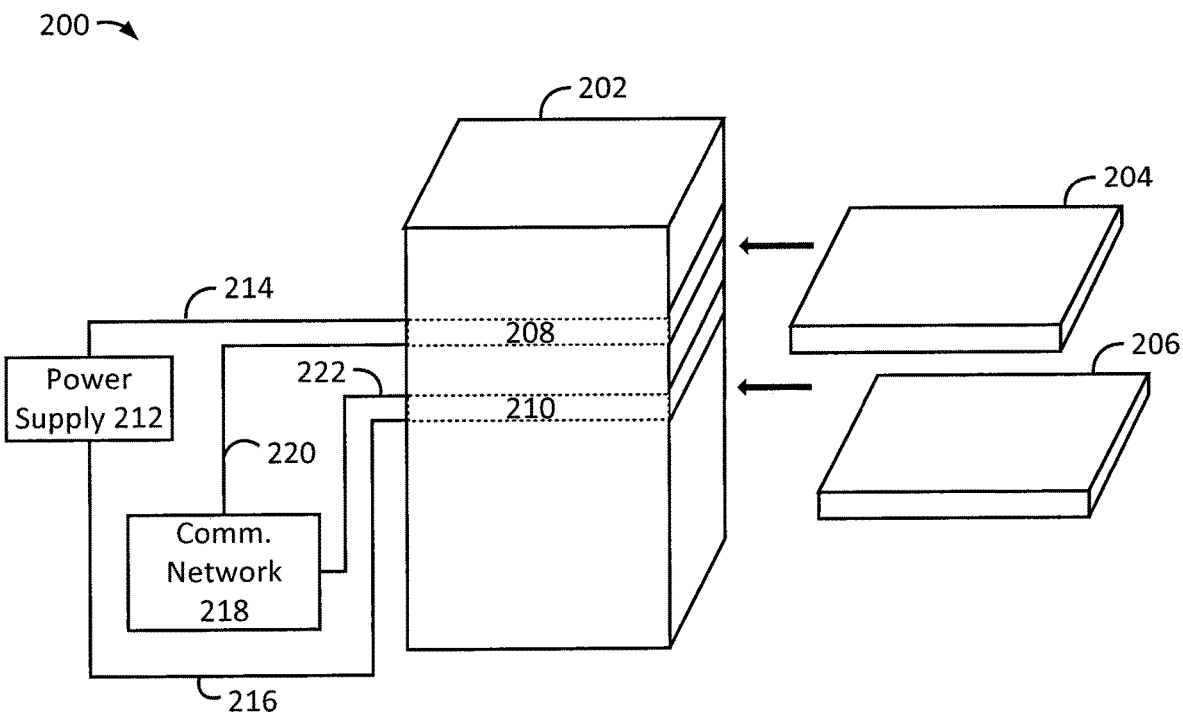
FIG. 2A illustrates an exemplary system configured to support a set of trays, according to an embodiment.

FIG. 2A illustrates exemplary system 200 configured to support a set of trays 204 and 206, according to an embodiment. The system 200 may, for example, include or take the form of the server 102 described above in relation to FIGS. 1A and 1B. In particular, the system 200 may also be referred to as the server 200 and/or the server system 200. As such, the system 200 may manage numerous personal information platforms (PIPs) for the users of client devices, such as the client devices 104 and/or 106. The system 200 may further support, operate, run, and/or manage the personal information platforms, possibly in addition to various applications, websites, and/or services.

As shown, the system 200 may include a chassis 202 that may support trays 204 and 206, possibly also referred to as servers and/or server trays 204 and/or 206. Notably, the chassis 202 may support multiple other servers and/or trays as well. The chassis 202 may include slots 208 and 210, among other possible slots, configured to hold or support trays 204 and 206, respectively. For example, the tray 204 may be inserted into the slot 208 and the tray 206 may be inserted into the slot 210. Yet, the slots 208 and 210 may be configured to hold the trays 204 and 206 interchangeably such that the slot 208 may be configured to hold the tray 206 and the slot 210 may be configured to hold the tray 204.

Further, the chassis 202 may be connected to a power supply 212 via connections 214 and 216 to provide power to the slots 208 and 210, respectively. The chassis 202 may also be connected to the communication network 218 via connections 220 and 222 to provide network connectivity to the slots 208 and 210, respectively. As such, trays 204 and 206 may be inserted into slots 208 and 210, respectively, and power supply 212 may supply power to trays 204 and 206 via connections 214 and 216, respectively. Further, trays 204 and 206 may be inserted into the slots 210 and 208, respectively, and power supply 212 may supply power to trays 204 and 206 via connections 216 and 214, respectively.

Yet further, trays 204 and 206 may be inserted into slots 208 and 210, respectively, and communication network 218 may provide network connectivity to trays 204 and 206 via connections 220 and 222, respectively. In addition, trays 204 and 206 may be inserted into slots 210 and 208, respectively, and communication network 218 may provide network connectivity to trays 204 and 206 via connections 222 and 220, respectively. The communication network 218 may, for example, take the form of the one or more communication networks 108, possibly including one or more of a data network and a cellular network. In some embodiments, the communication network 218 may provide a network port, a hub, a switch, or a router that may be connected to an Ethernet link, an optical communication link, a telephone link, among other possibilities.

In practice, the tray 204 may be inserted into the slot 208 and the tray 206 may be inserted into the slot 210. During operation, the trays 204 and 206 may be removed from the slots 208 and 210, respectively. Further, the tray 204 may be inserted into the slot 210 and the tray 206 may be inserted into the slot 208, and the system 200 may continue operating, possibly based on various data buffering mechanisms of the system 200. Thus, the capabilities of the trays 204 and 206 may facilitate uptime and the availability of the system 200 beyond that of traditional or conventional servers that may be required to run without interruptions. As such, the server trays 204 and/or 206 facilitate fault-tolerant capabilities of the server system 200 to further extend times of operation. In some instances, the server trays 204 and/or 206 may include specialized hardware, such as hot-swappable hard drives, that may be replaced in the server trays 204 and/or 206 during operation. As such, the server trays 204 and/or 206 may prevent interruptions to further increase uptime.

Figure 2B:
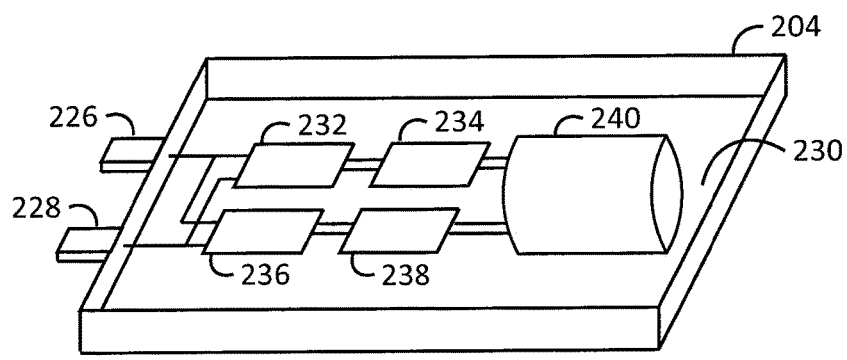
FIG. 2B illustrates an exemplary tray configured to support one or more components, according to an embodiment.

FIG. 2B illustrates an exemplary tray 204 configured to support one or more components, according to an embodiment. The tray 204, possibly also referred to as the server tray 204, may take the form of the tray 204 described in relation to FIG. 2A. Further, the tray 206 may also take the form of the tray 204. As shown, the tray 204 may include a tray base 230 that may include the bottom surface of the tray 204. The tray base 230 may be configured to support multiple components such as the hard drives described above and a main computing board connecting one or more components 232-240. The tray 204 may include a connection 226 that may link to the connections 214 or 216 to supply power to the tray 204. The tray 204 may also include a connection 228 that may link to the connections 220 or 222 to provide network connectivity to the tray 204. The connections 226 and 228 may be positioned on the tray 204 such that upon inserting the tray 204 into the slot 208, the connections 226 and 228 couple directly with the connections 214 and 220, respectively. Further, upon inserting the tray 204 into the slot 210, the connections 226 and 228 may couple directly with connections 216 and 222, respectively.

In some embodiments, the tray 204 may include a hardware processor component 232, a non-transitory memory component 234, a non-transitory data storage component 236, a communication interface component 238, that may, for example, take the form of the processor 112, the memory 114, the data storage 116, and the communication interface 118, respectively. Further, the tray 204 may include the data engine component 240 that may manage personal information platforms for numerous users. As such, the connections 226 and 228 may be configured to provide power and network connectivity, respectively, to each of the components 232-240. In some embodiments, one or more of the components 232-240 may perform operations described herein, illustrated by the accompanying figures, and/or otherwise contemplated As shown, the hardware processor component 232 may take the form of a multi-purpose processor, a microprocessor, a special purpose processor, a digital signal processor (DSP). Yet further, the processor component 232 may take the form of an application specific integrated circuit (ASIC), a programmable system on chip (PSOC), field-programmable gate array (FPGA), and/or other types of processing components. In particular, the processor component 232 may create, modify, and/or build PIPs for numerous users. For example, the processor component 232 may be configured with a Unix-based operating system. Further, the processor component 232 may support the scalability of PIPs generated with various other servers, such as those described above in relation to the data infrastructure 150. In particular, the processor component 232 may be configured to facilitate the scalability with multiple such servers of various forms that may, for example, include server trays, blades, and/or cartridges similar to the server trays 204 and/or 206. In some instances, the processor component 232 may be configured with scalable process architectures, including, reduced instruction set architectures. In some instances, the processor component 232 may be backwards compatible with various legacy systems to generate PIPs such that the processor component 232 may receive, read, and/or execute instruction sets with legacy data formats and/or structures. As such, the processor component 232 generally has capabilities beyond that of general-purpose processors.

The database engine component 240 may include one or more secure databases to generate, build, and/or manage PIPs for numerous users. In particular, the data base engine component 240 may organize and/or format the PIPs for optimizing searches and/or retrieving data. In various circumstances, the database engine component 240 may perform searches based on numerous queries, search multiple databases in parallel, and produce search results simultaneously and/or consecutively. Thus, the database engine component 240 may relieve various bottlenecks encountered with conventional servers managing numerous data entries.

Any two or more of the components 232-240 described above may be combined. For example, two or more of the hardware processor component 232, the non-transitory memory component 234, the non-transitory data storage component 236, the communication component and/or interface 238, and/or the data engine component 240 may be combined. Further, the combined component may take the form of one or more processors, DSPs, SOCs, FPGAs, and/or ASICs, among other types of processing devices and/or components described herein. For example, the combined component may take the form an SOC that integrates various other components in a single chip with digital, analog, and/or mixed-signal functions, all incorporated within the same substrate. As such, the SOC may be configured to carry out various operations of the components 232-240.

The components 232-240 described above may provide advantages over conventional or general-purpose components. For example, the components 232-240 may enable the system 200 to transfer data over the one or more networks 218 to numerous other client devices, such as the client devices 104 and/or 106. In particular, the components 232-240 may enable the system 200 to create, build, and/or modify PIPs for numerous users locally from a single server tray 204. In some instances, configuring a separate and/or dedicated hardware processor component 232 to generate, build, and/or manage PIPs may optimize operations beyond the capabilities of conventional servers and/or general-purpose processors. As such, the average wait time for the client device 104 to display data from the PIPs may be minimized accordingly.

It can be appreciated that the system 200, the chassis 202, the trays 204 and 206, the slots 208 and 210, the power supply 212, the communication network 218, and the components 232-240 may be deployed in other ways. The operations performed by components 232-240 may be combined or separated for a given embodiment and may be performed by a greater number or fewer number of components or devices. Further, one or more components or devices may be operated and/or maintained by the same or different entities.

Figure 3:
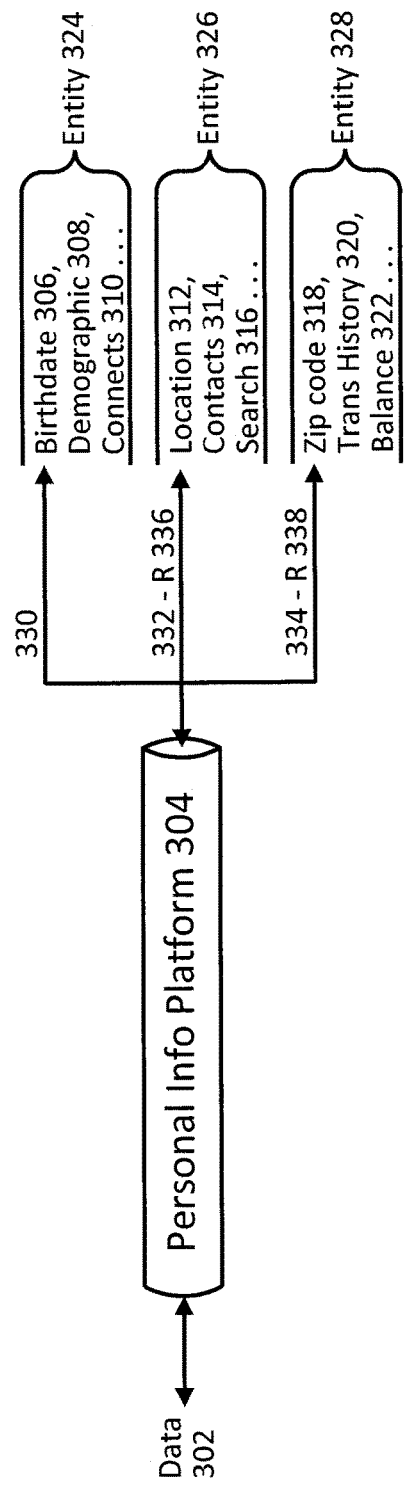
FIG. 3 illustrates a personal information platform (PIP) system, according to an embodiment.

FIG. 3 illustrates a personal information platform (PIP) system 300, according to an embodiment. As shown, the PIP system 300 generates, maintains, and/or supports data 302, possibly including various forms of data, types of data, and/or data entries related to a given user. Further, the PIP 304 may take the form of a data pipeline such that the data 302 enters the data pipeline and the PIP 304 manages or controls the data 306-322 that comes out from the data pipeline, among other data contemplated with the illustration of the multiple ellipses. Notably, the data 306-322 provided by the PIP 304 may be a subset of the data 302 that enters the PIP 304. Yet, in some instances, the data 306-322 may be the same or different from the data 302 that enters the data pipeline, and/or possibly a combination of the same and different data as contemplated herein.

In some embodiments, the PIP 304 may manage and/or control accesses to various fauns of data, possibly considered above as coming from the data pipeline. For example, the PIP 304 may control accesses to various forms of data, types of data, data related to categories, and/or data with varying levels of sensitivity identified, among other possibilities. As shown, for example, the PIP 304 may control accesses to the birthdate data 306, demographic data 308, connections data 310, location data 312, contacts data 314, search and/or search history data 316, zip code data 318, transaction or transaction history data 320, and/or balance data 322, among other forms of data contemplated with the ellipses provided. Notably, the PIP 304 may manage, and/or control data 302 and/or 306-322 with various data schemas. In particular, such data schemas may be represented in multiple formats, such as JavaScript Object Notation (JSON), Extensible Markup Language (XML), and/or Standard Generalized Markup Language (SGML), among other types of formants and/or database languages. Further, various benefits of such interchangeable data schemas may be realized. For example, one or more entities 324, 326, and/or 328 and other PIPs may be able to exchange, communicate, and/or understand the data 302 and/or 306-322 in one or more common methods as described or contemplated herein.

Further, the PIP 304 may create, control, and/or modify multiple accesses to data, possibly considered coming from the data pipeline. For example, the PIP 304 may control the accesses 330, 332, and/or 334 to the data coming from the pipeline. In some instances, the PIP 304 may control access 330 to the entity 324 such that the entity 324 has the access 330 to the birthdate data 306, the demographic data 308, and/or the connections data 310, among other data and/or data entries contemplated above. Further, the PIP 304 may control the access 332 such that the entity 326 has the access 332 to the location data 312, contacts data 314, and/or search data 316, among other data and/or data entries contemplated above. Yet further, the PIP 304 may control the access 334 such that the entity 328 has the access 334 to the zip code data 318, transaction history data 320, and/or balance data 322, among other data and/or data entries contemplated above.

Without any limitations to the embodiments described herein, consider a given scenario where the entity 324 is a service provider that manages a networking account for the user, such as a social networking account and/or a professional networking account. In this scenario, the PIP 304 may determine that the services provided by the entity 324, e.g., managing the user's networking account, may be adequately performed without the user's demographic data 308, possibly indicating the user's nationality, ethnicity, and/or education background. In some instances, the PIP 304 may determine that the demographic data 308 is not utilized or not often utilized by the entity 324 to perform the services for the user, possibly the services that the user desires. As such, the PIP 304 may modify the access 330 such that the entity 324 does not have the access 330 to the demographic data 308, possibly requesting the entity 324 to remove the demographic data 308 from its data storages and/or networks. Notably, the PIP 304 may collect, scrape, and/or retrieve various forms of data (e.g., the data 308) from various websites and/or remote web servers running such websites. In some instances, the PIP 304 may perform utilization analyses, logic computations, and/or other operations associated with the data 308 collected by the entity 324 as described above, possibly to alert the user that certain data 308 is present or held with such entities without being used by such entities. Further, in some instances where such entities are managed by the PIP 304, the PIP 304 may request that the entities stop using that data 308.

In some instances, the PIP may create, control, and/or remove the accesses 330, 332, and/or 334 with rules 336 and/or 338. For example, consider another scenario where the entity 326 is a provider of an application, possibly referred to as a mobile app. For example, referring back to FIGS. 1A and 1B, the user of the client device 104 may download the mobile app with the client device 104. In this scenario, the PIP 304 may identify approximately nine requests from the mobile app to access the user's data 302, as described in scenarios above. Yet, the PIP 304 may further identify that the location data 312 is required by the mobile app to perform one or more services for the user. As such, the PIP 304 may implement a rule 336 such that the app has the access 332 to the location data 312, possibly without access to the contacts data 314 and/or the search data 316. Yet, in some instances, the app may have access to the contacts data 314 and/or the search history data 316, possibly based on the user accepting a request from the entity 326 for such data. As such, based on a user input indicating an acceptance to such a request, the mobile app may have the access 332 to the contacts data 314 and/or the search data 316.

Considering the scenarios described above, the entity 328 may be a credit card company. As such, further considering the scenarios above, the PIP 304 may identify that the user visits a certain gas station on a regular basis to purchase gas using a credit card and the zip code data 318. As such, the PIP 304 may provide the entity 328 with access 334 to the zip code data 318. Yet, in some instances, the PIP 304 may implement a rule 338 such that the entity 328 has the access 334 to the zip code data 318 for purposes of verifying the user's purchases at one or more gas stations. Yet, the PIP 304 may also implement the rule 338 such that the entity 328 must ask the user for permission to utilize the zip code data 318 for purposes other than verifying the user's purchases at one or more gas stations. Further, the rule 338 may prohibit the entity 328 from transferring the zip code data 318.

Notably, the PIP 304 may also control various aspects of the data 306-322. For example, the PIP 304 may control accesses to the birthdate data 306 that may indicate the user's birthday, including the day, month, and/or year of the user's birthday. In particular, the PIP 304 may control access 330 such that the entity 324 has the access 330 to the month and the day of the user's birthday. Yet, the access 330 may be controlled such that the entity 324 does not have the access 330 to the user's birth year and/or age, possibly based on user inputs and/or configurations. In possibly similar respects, the PIP 304 may also control various aspects of the connections data 310 that may indicate a number of connections the user may have with one or more networks. For example, the PIP 304 may control the access 330 to a subset of the user's connections identifiable from the connection data 310, possibly without granting the access 330 to other subsets of the user's connections identifiable from the connections data 310.

Further, the PIP 304 may also control aspects of the location data 302, possibly retrieved from a client device or a smartphone device of the user. For example, referring back to FIGS. 1A and 1B, various forms of location data may be retrieved based on the connection established with the client device 104 and the PIP server 102. As such, based on data exchanges for establishing the connection, the PIP server 102 may retrieve and control Wi-Fi beaconing data, Enhanced Observed Time Difference (EOTD) data, global positioning System (GPS) data, Assisted GPS (A-GPS) data, Differential GPS (DGPS) data, Time Difference of Arrival (TDOA) data, Angle of Arrival (AOA) data, triangulation data, among other forms of location data of the client device 104 as described herein. As such, the PIP 304 may control accesses to various types of location data 302 described above.

Yet further, the PIP 304 may control aspects of contacts data 314, possibly indicating data associated with a number of contacts of the user. For example, the PIP 304 may control accesses to names (e.g., first, middle, and last), email addresses, home addresses, work addresses, and/or telephone numbers, among other types of data associated with the user's contacts. In addition, the PIP 304 may control aspects of the search and/or search history data 316. For example, the PIP 304 may control data indicating websites, applications, browsers, searches, search strings, words, phrases, sentences, and/or other terms searched by the user, possibly over one or more periods of time including a number of years. Further, the PIP 304 may control click data that indicates the user selections associated with the browsing as described above. In particular, the click data may indicate various links that the user selects and/or interacts with in some manner, among other possibilities that may indicate the user's interests.

In additional examples, the PIP 304 may identify various websites or web servers that may already have the user's data 302. In particular, the PIP 304 may identify websites the user may have visited and/or websites that received the user's data 302 based on user inputs. Further, the PIP 304 may identify websites that may have collected the user's data 302 from other sources or entities, e.g., the entities 324, 326 and/or 328. As such, the PIP 304 may collect, scrape, and/or retrieve the user's data 302 from various websites or web servers, possibly to display identifications of the websites or web servers to the user. As such, the data 302 may also include data from other such sources or entities in addition to data provided by the user. As such, the data 302 may be retrieved from the Internet, private websites, and/or public websites, possibly including data that the user may want to access and/or control. For example, the user may want to control the data 302 based on such sources or entities described above that may have access to the data 302.

In addition, the PIP 304 may also control aspects of the transaction history data 320, possibly including bank account data, credit card numbers, and/or debit card numbers, among other types of data associated with transferring fund amounts from the user's account. Further, the PIP 304 may control aspects of the balance data 322, possibly including one or more balances of one or more of the user's accounts, such as the user's credit card and/or debit accounts.

It should be noted that the various aspects of FIG. 3 are provided for illustrative purposes and should not be interpreted as limiting. For example, the types of data 306-322, the entities 324, 326, and/or 328, the accesses 330, 332, and/or 332, and/or the rules 336 and/or 338 are provided for purposes of illustration and explanation, without any limitations to aspects of the disclosures. Thus, it should be noted that the data 302 may include various other types and/or forms of data that may be associated with the user. For example, the data 302 may indicate the user's social security number, driver's license number, and/or the user's account numbers, among other numerical identifiers. Further, the data 302 may indicate account data, such as one or more accounts with service providers, such as e-mail accounts, communications accounts, and/or networking accounts described above.

In some embodiments, the PIP system 300 includes a non-transitory memory including instructions and one or more hardware processors. In some examples, referring back to FIGS. 1A-2B, the PIP system 300 includes the non-transitory memory 114 that stores the instructions and the one or more hardware processors 112. For instances, the one or more hardware processors 112 is coupled to the non-transitory memory 114 to read the instructions. In some instances, the PIP system 300 performs a number of operations. The operations include determining data 302 associated with a user. Further, the operations include determining a personal information platform 304 based at least on the data 302 associated with the user, where the personal information platform 304 is configured to identify a number of data types 306-322 from the data 302 associated with the user. Yet further, the operations include determining, based at least on the personal information platform 304, accesses 330, 332, and/or 334 of one or more entities 324, 326, and/or 328 to the number of data types 306-322 based at least on one or more services provided by the one or more entities 324, 326, and/or 328 to the user. In addition, the operations include causing a client device to display an indication of the personal information platform 304. For example, referring back to FIGS. 1A-2B, the client 104 may display the indication of the personal information platform 304, where the indication displayed provides the one or more accesses 330, 332, and/or 334 of the one or more entities 324, 326, and/or 328 to the number of data types 306-322.

In some embodiments, the indication of the personal information platform 304 is displayed on a graphical user interface (GUI) of a client device, possibly operated by the user. For example, referring back to FIGS. 1A-1B, the indication of the PIP 304 may be displayed on a GUI of the client device 104, possibly provided by the I/O interface 130. In particular, the I/O interface 130 may be configured to receive one or more user inputs, such as touch inputs from the user. As such, the accesses 330, 332, and/or 334 of the one or more entities 324, 326, and/or 328 to the number of data types 306-322 may be controlled based on the one or more user inputs.

In some embodiments, the personal information platform 304 is further configured to determine one or more data types from the number of data types 306-322. For example, the PIP 304 may select the one or more data types, such as the location data 312, from the number of data types 306-322. In some instances, the one or more data types, such as the location data 312, may be required by the one or more entities 324, 326, and/or 328, such as the mobile app provider described above. Yet further, the one or more data types 306-322 may be required by the one or more entities 324, 326, and/or 328 to provide the one or more services for the user. As such, the access 332 for the one or more entities 326 may be determined with a limitation to the one or more data types 306-322, including the location data 312. In particular, for example, the access 332 may be limited to the location data 312 without having access to the contacts data 314 and/or the search data 316, possibly as described above.

As noted, referring back to FIGS. 1A-2B, the PIP system 300 may include the one or more hardware processors 112 that cause the PIP system 300 to perform further operations. For example, the operations include determining a number of rules, such as the rules 336 and/or 338, among other possible rules. For instances, the rules 336 and/or 338 may be associated with the accesses 332 and/or 334, respectively, possibly for the one or more entities 326 and/or 328 to the number of data types 312-322. Further, the operations may include determining at least one change to the accesses 332 and/or 334 based at least on the number of rules 336 and/or 338, where the change limits the accesses 332 and/or 334 to the number of data types 312-322. In particular, one or more changes may limit the access 332 to the location data 312 and the access 334 to the zip code data 318, among other possibilities.

In some embodiments, the operations may include generating a digital report card associated with the personal information platform 304 on a periodic basis, possibly generating the report card on demand based on user inputs. For example, referring back to FIG. 1B, the PIP server 102 may generate the digital report card monthly and/or annually, possibly based on compiling the user's data 302 from the user controls server 162 and/or the user account server 164. In some instances, the operation may include causing the client device 104 to display the digital report card on the periodic basis. For example, the server 102 may establish a connection with the client device 104 based on identifying the IP address of the client device 104 with the web server 153. As such, the server 102 may transmit data/data packets 122 to the client device 104 that indicates the digital report card. In particular, the client device 104 may display the digital report card, possibly displaying the digital report card with the I/O interface 130 of the client device 104. In some instances, the digital report card displayed may indicate one or more changes to the accesses 330, 332, and/or 334, among other accesses for the one or more entities 324, 326, and/or 328 to the number of data types 306-322.

As noted in the scenarios above, the user's data may be an asset. Thus, there may be various values associated with the user's data 302, such as an intrinsic value of the data 302 to the user, an extrinsic value of the data 302 to the one or more entities 324, 326, and/or 328, and possibly a combination of such values, among other possible values contemplated herein. In some embodiments, the operations may include determining a value for at least one data type, such as the location data 312, from the number of data types 306-322 based on the one or more entities 324-328 interested in the one data type. For example, a value for the location data 312 may be determined based on the one or more entities 324-328 interested in the location data 312 of the user. As such, the indication of the PIP 304 displayed may further indicate the value for the one data type, such as the location data 312.

As noted, referring back to FIGS. 1A-2B, the PIP system 300 may include the one or more hardware processors 112 that cause the PIP system 300 to perform further operations. In some instances, the operation may include generating a digital report card associated with the personal information platform 300 based on the value for the at least one data type described above. As such, the operations may include causing the client device, such as the client device 104, to display the digital report card, as described above. Yet, in some instances, the digital report card indicates a level of trust associated with a transfer of the one data type from the data 306-322 to the one or more entities 324, 326, and/or 328 for the value determined. As noted, for example, the one type data may include the location data 312. As such, the level of trust may be associated with the entities 324, 326, and/or 328 using the location data 312 to provide services for the user, without using the location data 312 for purposes other than providing services for the user, such as transferring the location data 312 to other (secondary) entities.

Figure 4A:
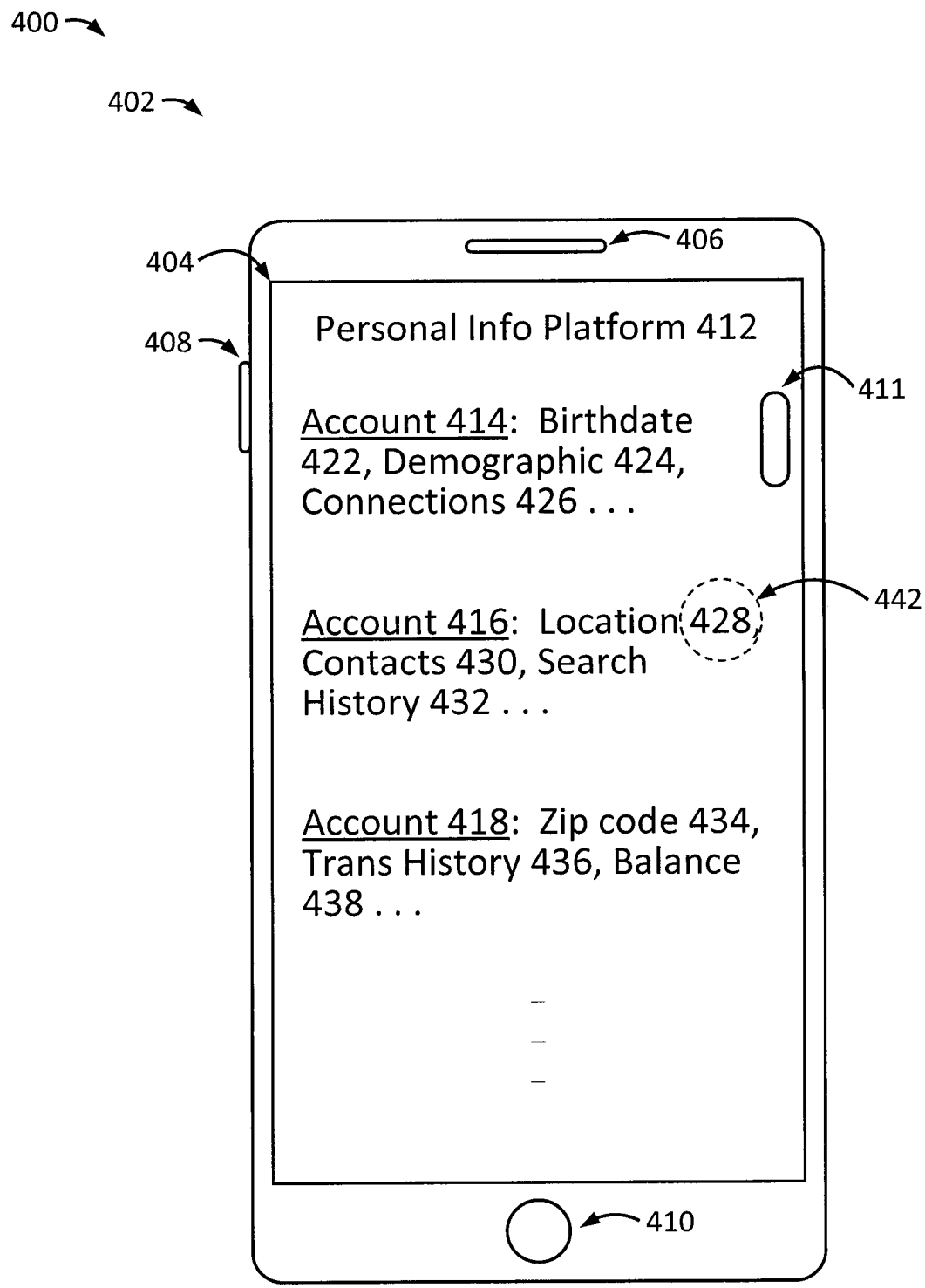
FIG. 4A illustrates an exemplary system with a client device, according to an embodiment.

FIG. 4A illustrates an exemplary system 400 with a client device 402, according to an embodiment. The system 400, possibly referred to a smartphone system 400, may include the aspects of the systems 100, 150, 200, and/or 300 described in relation to FIG. 1A-3. For example, the client device 402 may include one or more components of the client device 104 described above in relation to FIG. 1A-3. In particular, the smartphone system 400 may include a speaker/microphone 406, a side button 408, and/or a control button 410, among other possible hardware components.

As shown, the smartphone system 400 may include a display 404, possibly also referred to as the graphical user interface 404. In particular, the graphical user interface 404 may provide the indication of the personal information platform (PIP) 412 associated with a user. As such, the user of the smartphone system 400 may view the PIP 412 and the accounts 414, 416, and/or 418, among other accounts of the user, as contemplated with the ellipses below the account 418. Further, the scroll bar 411 may be used to provide the other accounts of the user. Yet, in some instances, the PIP 412 may be configured such that the user may view all of the user's accounts from a single display, such as the graphical user interface 404.

In various embodiments, the PIP 412 may provide a portal to multiple accounts 414, 416, and/or 418 of the user. For example, the account 414 may be a networking account of the user, such as a personal, social, and/or a professional networking account of the user. In particular, the account 414 may include birthdate data 422, demographic data 424, and/or the connections data 426 that may take the form of the data 306, 308, and/or 310, respectively, as described above in relation to FIG. 3. Further, the account 416 may be an email account of the user. In particular, the account 416 may include location data 428, contacts data 430, and/or search history data 432 that may take the form of the data 312, 314, and/or 316, respectively, as described above in relation to FIG. 3. Yet further, the account 418 may be a payment provider account of the user. In particular, the account 418 may include zip code data 434, transaction history data 436, and/or balance data 438 that may take the form of the data 318, 320, and/or 322, respectively, as described in relation to FIG. 3. Notably, the accounts 414, 416, and/or 418 may be provided by the entities 324, 326, and/or 328, possibly service providers of the account 414, 416, and/or 418, respectively. Further, the accounts 414, 416, and/or 418 may be accessed with touch inputs received to the GUI 404, as described herein. For example, a touch input over the alphanumeric characters of the account 414 may link to the account 414.

In some embodiments, the smartphone system 400 may also include a non-transitory machine-readable medium. For example, referring back to FIG. 1A, the smartphone system 400 may include the non-transitory data storage 136. In some instances, the non-transitory machine-readable medium may have stored thereon machine-readable instructions executable to cause a machine, such as the smartphone system 400, to perform operations. In some instances, the operations include determining one or more accounts 414, 416, and/or 418 associated with a user. For example, the smartphone system 400 may search, identify, and/or recognize the accounts 414, 416, and/or 418, possibly based on the accounts 414, 416, and/or 418 being accessed with the smartphone system 400.

Further, the operations include determining the personal information platform 412 based at least on the one or more accounts 414, 416, and/or 418. For example, the personal information platform 412 may be generated to include the one or more accounts 414, 416, and/or 418. Yet further, the personal information platform 412 is configured to access data 422-426, 428-432, and/or 434-438 from each of the one or more accounts 414, 416, and/or 418, respectively. In addition, the operations include determining, based at least on the personal information platform 412, a number of data entries 422-438 provided with the one or more accounts 414, 416, and/or 418. Further, the operations include causing the client device 402 to display an indication of the personal information platform 412. As such, the indication displays the number of data entries 422-438 provided with the one or more accounts 414, 416, and/or 418.

In some embodiments, the indication of the personal information platform 412 is displayed on the graphical user interface 404 of the client device 402, possibly configured to receive a number of touch inputs. As shown, the graphical user interface 404 may receive one or more touch inputs 442. In some instances, the data 422-438 provided with the accounts 414, 416, and/or 418 may be controlled with the one or more touch inputs 422. For example, the one or more touch inputs 422 may remove the location data 428 from the account 416, possibly such that the data 428 is no longer accessible through the account 416. For example, referring back to FIG. 3, the entity 326, possibly the service provider of the email account 416, may no longer have access to the location data 428. In further examples, one or more transfers of the number of data entries 422-438 from the one or more accounts 414-418 are controlled based on the one or more touch inputs 422 received. In particular, the one or more touch inputs 442 may prevent the location data 428 from being transferred from the account 416, possibly prevented from being transferred to other entities.

Figure 4B:
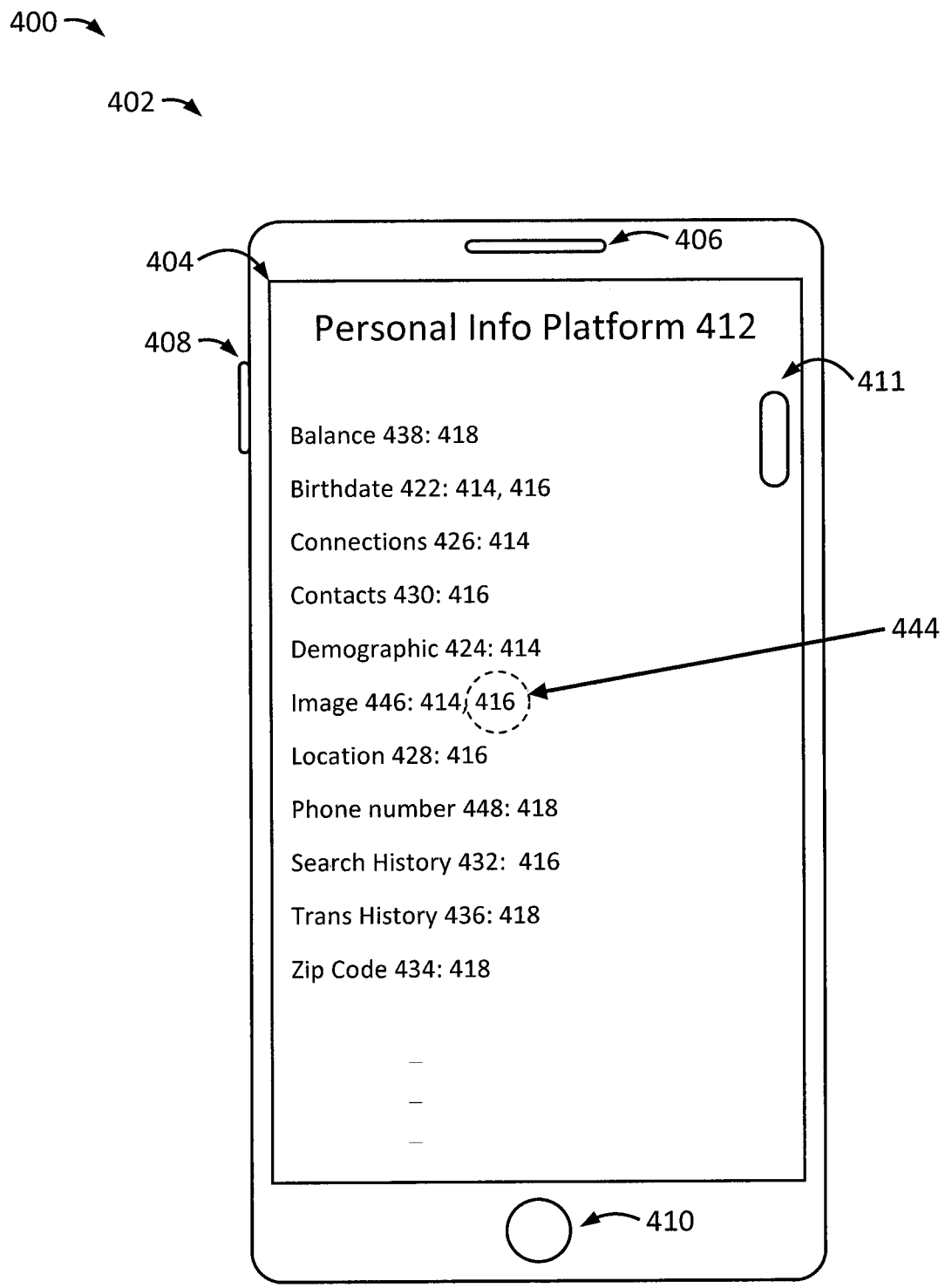
FIG. 4B illustrates an exemplary system with a client device, according to another embodiment.

FIG. 4B illustrates the exemplary system 400 with the client device 402, according to another embodiment. As described above, the system 400 may be referred to as the smartphone system 400. As shown, the graphical user interface 404 may provide the indication of the personal information platform (PIP) 412. Yet further, the data entries 422-438 may be provided in a list format, possibly with other data entries as contemplated with the ellipses. In addition, each data entry is provided with at least one account from the accounts 414, 416, and/or 418, among other possible accounts. As such, the user is able to view various data entries 422-438 and also respective accounts provided with the data entries. It should be noted that one or more of the data entries may not be provided to any of the accounts.

Also shown is the scroll bar 411 that may be used to view the other data entries. Yet, in some instances, the PIP 412 may be configured such that the user may view all of the data entries 422-438 and additional entries in a single display, such as the graphical user interface 404. In this example, the data entries may be provided in alphabetical order such that the user can scroll through the entries with the scroll bar 411 to search for one or more data entries efficiently.

Also shown in FIG. 4B is the image data 446 and the phone number data 448. For example, consider the scenarios above where the account 414 is a networking account, the account 416 is an email account, and the account 418 is a payment provider account. In various circumstances, the PIP 412 may determine the account 418 may utilize the phone number data 448 to provide services for the user, such as sending the user text message notifications regarding the user account 418. Further, the PIP 412 may determine the account 414 may utilize the image data 446 to create the user's profile of the account 416, possibly for networking purposes. Yet, the PIP 412 may determine that the account 416 has not utilized the image data 446 for any services provided to the user. As such, the PIP 412 may remove the image data 446 from being provided with the account 416. Yet further, the PIP 412 may remove the image data 446 based on one or more user inputs 444 received by the graphical user interface 404, possibly including touch inputs to the GUI 404.

As noted, the machine-readable instructions may be executable to cause the machine, such as the smartphone system 400, to perform further operations. The operations may include determining a number of requests from one or more entities. For example, referring back to FIG. 3, the one or more entities may include the one or more entities 324, 326, and/or 328, and/or other entities that request data from users. In some instances, the one or more entities may request for access to the number of data entries 422-438 and/or 446-448 associated with the user. Further, the operations may include determining, based at least on the personal information platform 412, whether the number of data entries 422-438 is required by the one or more entities.

For example, as noted, it may be determined whether the one or more entities 324, 326, and/or 328 require the data. Further, it may be determined whether the entries 422-438 and/or 446-448 are required to provide services associated with the user. In some embodiments, the operations may include determining one or more accesses for the one or more entities 324, 326, and/or 328. For example, the one or more accesses 330, 332, and/or 334 may be provided to the one or more entities 324, 326, and/or 328, as described above. As such, the number of data entries 422-438 and/or 446-448 may be accessed based at least on whether the number of data entries 422-438 and/or 446-448 is required to provide the services associated with the user.

Notably, the control button 410 may include a fingerprint sensor to authenticate the user inputs 442 and/or 444. For example, the fingerprint sensor may detect a fingerprint from one or more authorized users to authenticate the user's inputs 442 and/or 444. For example, one or more of the user's fingerprint inputs (e.g., thumb and index fingerprint inputs) may be provided to the control button 410 to authenticate the user inputs 442 and/or 444.

In some embodiments, referring back to FIG. 1B, the system 150 may activate an application, such as a mobile app on the client device 104, possibly a PIP app to view one or more PIPs of the user. For example, the PIP server 102 may establish a connection with the client device 104 over the one or more networks 108, possibly based on one or more calls exchanged with the API server 156. As such, the PIP app may be activated to display the GUI 404 shown in FIGS. 4A-4B. Further, the app may be activated to alert the user with the one or more notifications and/or suggestions, such as to modify and/or remove accesses. For example, one notification may suggest that the image data 446 may be restricted and/or removed from being provided with the account 416.

Figure 4C:
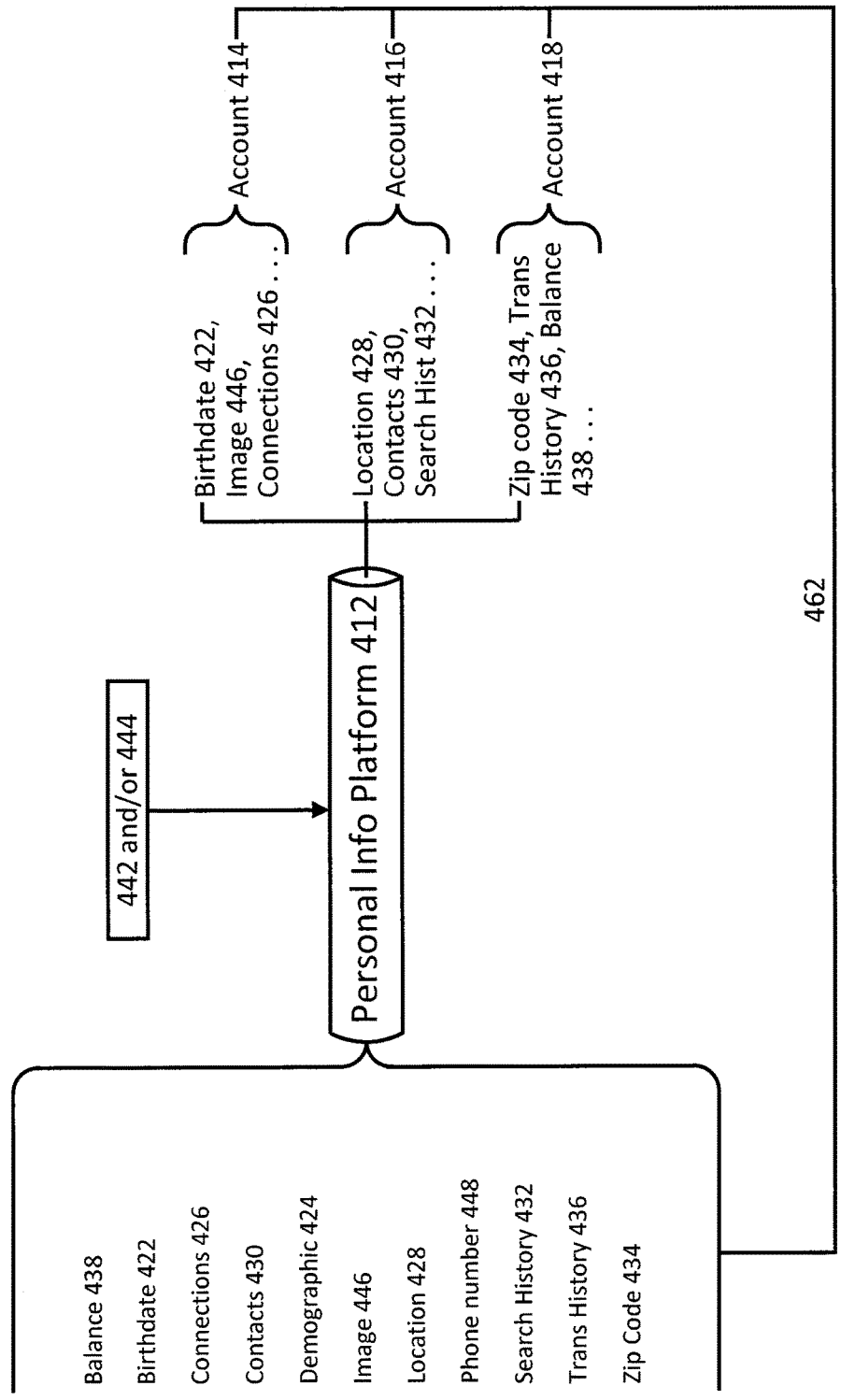
FIG. 4C illustrates a PIP system, according to another embodiment.

FIG. 4C illustrates a personal information platform (PIP) system 460, according to another embodiment. As shown, the PIP system 460 manages, maintains, and/or supports data 422-438 and/or 446-448. Further, the PIP 412 may also take the form of a data pipeline such as the PIP 304 described above in relation to FIG. 3. As such, the PIP 412 manages or controls the data 422-438 and/or 446-448 that comes into the data pipeline and the data 422, 426-438, and 446 shown in this example coming out of the data pipeline, among other data contemplated with illustration of the ellipses.

Also shown are the user inputs 448 and/or 450. In particular, consider the user inputs 448 and/or 450 to the graphical user interface 404 described above in relation to FIGS. 4A-4B. In some instances, the user inputs 442 and/or 444 may be inputs to the data pipeline of the PIP 412, possibly also affecting the data 422, 426-438, and 446 coming out of the data pipeline. For example, the PIP 412 may remove the demographic data 424 from being provided with the account 414. As shown, the image data 446 may be provided with the account 414. Yet further, the PIP 412 may remove the image data 446 from being provided with the account 416 based on the user input 444. As such, the PIP 412 may add, remove, and/or change the data 422-438 and/or 446-448 provided with the accounts 414, 416, and/or 418.

In some embodiments, a feedback loop 462 may also be provided. For example, one or more additions, changes, and/or modifications to the data 422-438 and/or 446-448 may be generated from the accounts 414, 416, and/or 418. In another scenario, a user may update their profile in the account 414, possibly uploading additional images to the profile. As shown, for example, the image data 446 may be provided in the feedback loop 426 to the data 422-438 and/or 446-448 going into the pipeline of the PIP 412.

As noted, the machine-readable instructions may be executable to cause the machine, such as the smartphone system 400, to perform further operations. The operations may include determining one or more rules associated with the number of data entries 422-438 and/or 446-448 provided with the one or more accounts 414, 416, and/or 418. For example, referring back to FIG. 3, the one or more rules 336 and/or 338 may be determined with the number of data entries 422-438 and/or 446-448. Further, the operations may include determining one or more transfers of the number of data entries 422-438 and/or 446-448 from the one or more accounts 414, 416, and/or 418 based at least on the one or more of rules.

Figure 5A:
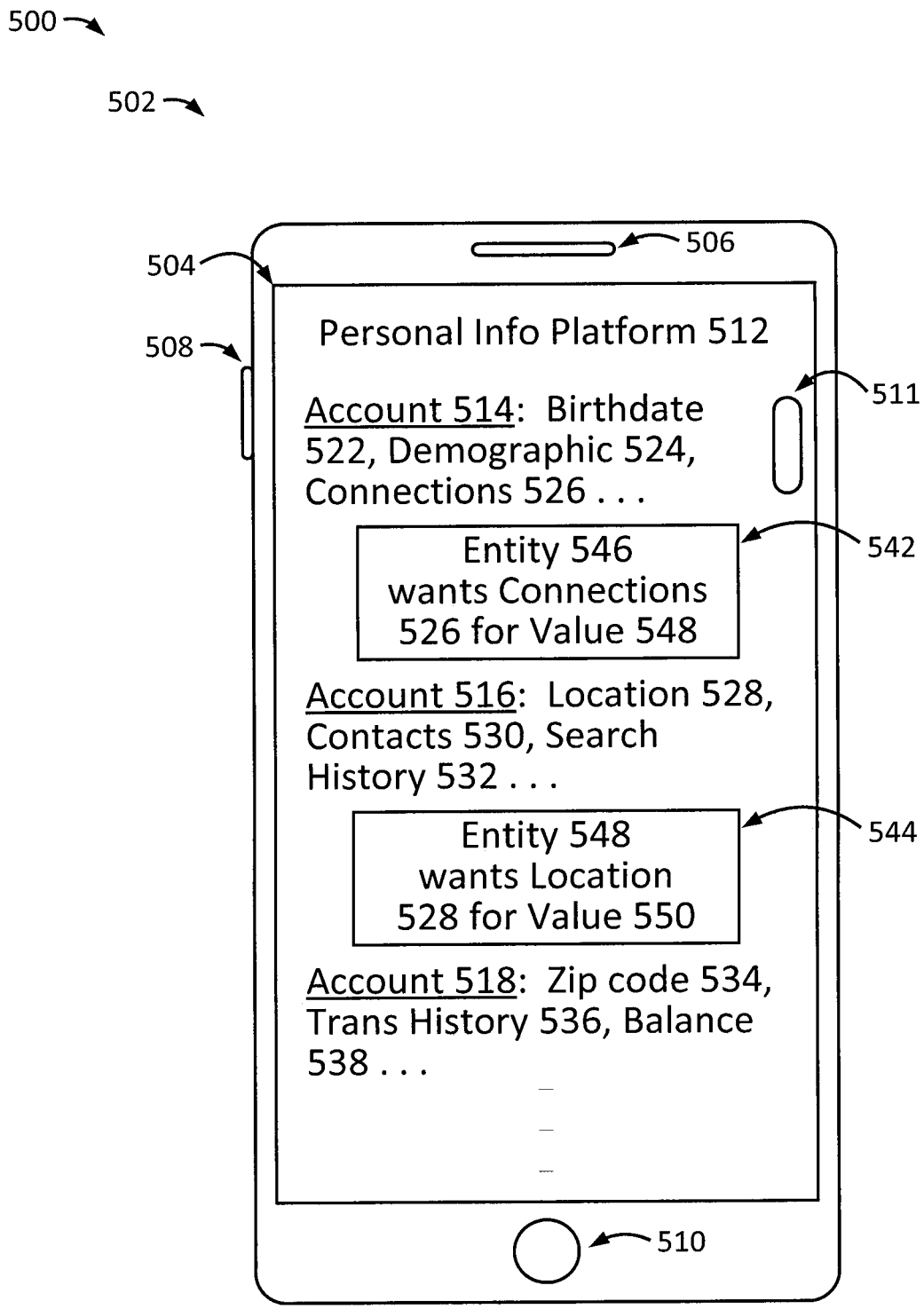
FIG. 5A illustrates an exemplary system with a client device, according to an another embodiment.

FIG. 5A illustrates the exemplary system 500 with the client device 502, according to another embodiment. The system 500, possibly referred to a smartphone system 500, may include aspects of the system 400 described above in relation to FIGS. 4A-4B. For example, the smartphone system 500 may include the client device 502, a graphical user interface 504, a speaker/microphone 506, a side button 508, a control button 510, and/or a scroll bar 511 that may take the form of the client device 402, a graphical user interface 404, a speaker/microphone 406, a side button 408, a control button 410, and/or a scroll bar 411, respectively.

Further, the GUI 504 may provide the accounts 514, 516, and/or 518 that take the form of the accounts 414, 416, and/or 418 described above. Yet further, the GUI 504 may provide birthdate data 522, demographic data 524, and/or the connections data 526 that takes the form of birthdate data 422, demographic data 424, and/or the connections data 426, respectively. Further, the GUI 504 provides location data 528, contacts data 530, and/or search or search history data 532 that takes the form of location data 428, contacts data 430, and/or search history data 432, respectively. Yet further, the GUI 504 provides zip code data 534, transaction history data 536, and/or balance data 538 that takes the form of zip code data 434, transaction history data 436, and/or balance data 438, respectively.

As shown, the GUI 504 also provides notifications 542 and/or 544. For example, the notification 542 provides that the entity 546 wishes to receive and/or have access to at least a portion of the connections data 526 for a value or an amount 548. Notably, the entity 546 may be an online service provider that wishes to receive the user's connection data 526 to identify possible networking connections, professional networking groups, and/or other possible connections identifiable from the connections data 526 that may facilitate targeted services and/or advertisements of the service provider. In some instances, the entity 546 may represent a number of entities and/or service providers interested in at least a portion of the connections data 526 for the market value or amount 548.

As also shown, the, notification 544 provides that entity 548 wishes to receive and/or have access to at least a portion of the location data 528 for a value or an amount 550. Notably, the entity 548 may be a provider of mobile apps and/or online entity that wishes to receive the user's smartphone location data 528 to transmit targeted offers and/or advertisements based on location. In some instances, the entity 546 may represent a number of entities and/or service providers interested in at least a portion of the location data 528 for the market value or amount 550.

In some instances, the amounts 548 and/or 550 may be based on one or more arbitration models, possibly taking into account intrinsic values of the user, extrinsic values of the entities 546 and/or 548, and possibly a combination of these values, as described above. In some instances, the notifications 542 and/or 544 may each provide a level of trust associated with providing the connections data 526 to the entity 546 and the location data 528 to the entity 548, respectively. Yet further, the PIP 512 may provide the notifications 542 and/or 544 with various details of the entities 546 and/or 548 to further determine whether to approve requests from the entities 546 and/or 548 for the data 526 and/or 528, respectively.

As noted, the machine-readable instructions may be executable to cause the machine, such as the smartphone system 500, to perform further operations. For example, the operations may include determining a value 548 for the data entry 526 from the number of data entries 522-538 based at least on one or more entities 546 interested in the data entry 526. Further, the indication of the PIP 512 may be displayed to further indicate the value 548 for the at least one data entry 526. Further, the operations may include receiving an indication to transfer the data entry 526 to the one or more entities 546 for a fee for the value 548 based at least on one or more touch inputs from the user. Yet further, the operations may include causing the indication PIP 512 displayed to further indicate details of the transfer of the data entry 526 to the one or more entities 546.

Figure 5B:
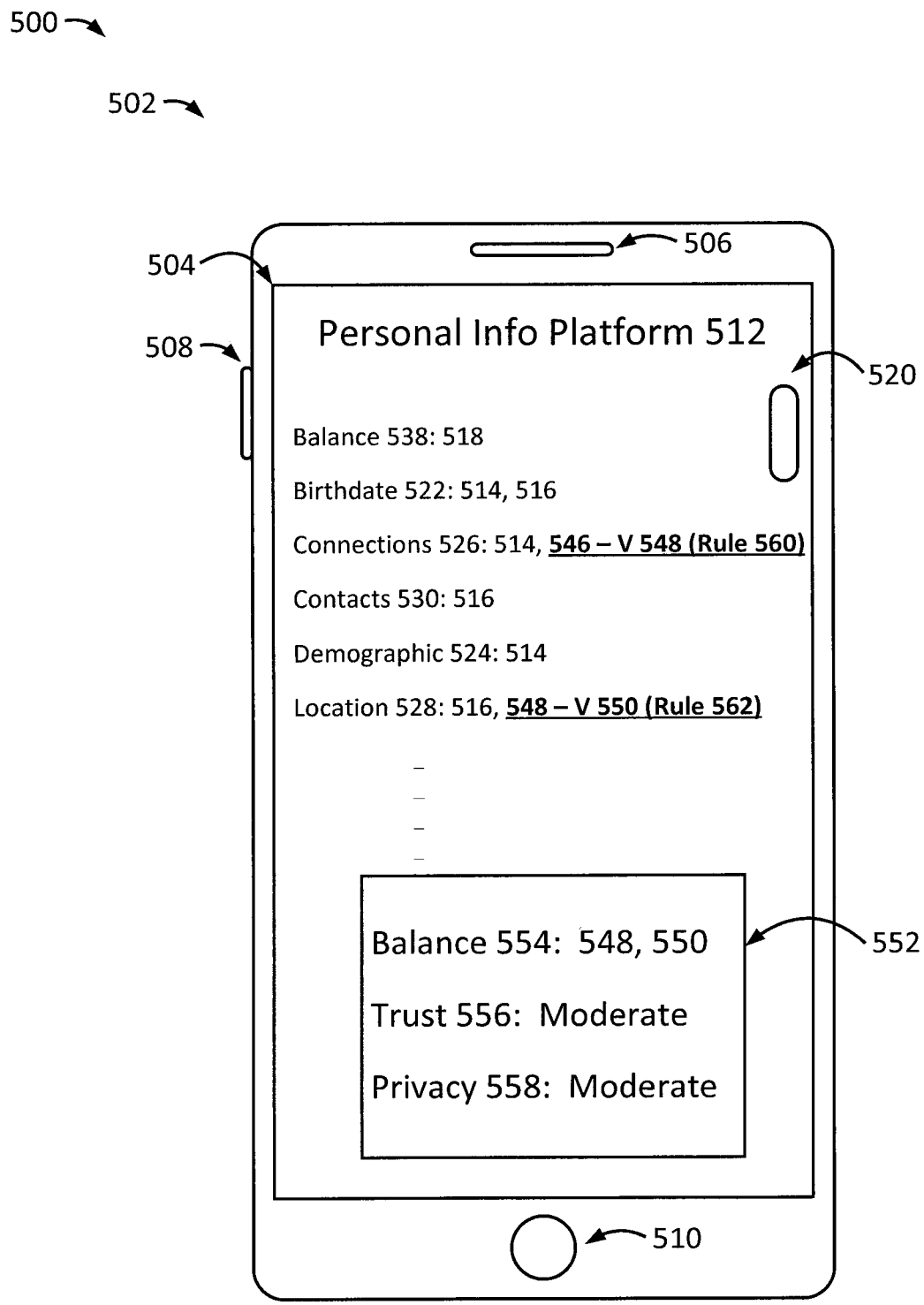
FIG. 5B illustrates an exemplary system with a client device, according to an another embodiment.

FIG. 5B illustrates the exemplary system 400 with the client device 502, according to another embodiment. As described above, the system 500 may be referred to as the smartphone system 500. As shown, the graphical user interface (GUI) 504 may provide the indication of the personal information platform (PIP) 512. Yet further, the data entries 522-538 may be provided in a list format, possibly with other data entries as contemplated with the ellipses. In addition, each data entry may be provided with at least one account from the accounts 514, 516, and/or 518, among other possible accounts. Further, each data entry may be provided with a value metric that indicates a market value for the entry, such as the values 548 and/or 550. Yet further, each data entry may be provided by a trust indicator based on the one or more accounts 514, 516, and/or 518 provided with each data entry.

As shown, the indication of the PIP 512 in the GUI 504 provides the entity 546 provided with access to the connections data 526 for the value 548, possibly with a rule 560. For example, the rule 560 may be similar to the rule 336 described above in relation to FIG. 3, where the entity 546 has access to a particular subset of the connections data 526, possibly without access to other subsets of the connections data 526. Further, the indication of the PIP 512 provides the entity 548 provided with access to the location data 528 for the value 550, possibly based on a rule 562. For example, the rule 560 may be similar to the rule 338 described above. Notably, the rules 560 and/or 562 may or may not affect the values 546 and/or 548, possibly based on the restrictions and/or limitations of the rules 560 and/or 562.

It should be noted that each of the data entries 522-538 possibly shown are based on the position of the scroll bar 520. Further, as noted, each entry may also be provided with level of trust associated with each data entry. For example, the level of trust for each entry may indicate whether the one or more accounts 514, 516, and/or 518 provided with the data entry is trusted with each particular data. As noted, the machine-readable instructions may be executable to cause the machine, such as the smartphone system 500, to perform further operations. In some instances, the operations may include generating a report card associated with the personal information platform 512 on a periodic basis. Further, the operations may include causing the client device 502 to display the report card on the periodic basis, where the report card displayed indicates a level of trust for each of the number of data entries 522-538. For example, the report card may display the level of trust based at least on the one or more accounts 514, 516, and/or 518 provided with the number of data entries 522-538.

As shown in FIG. 5B, an indication of the report card 552 is provided. In particular, the balance 554 may indicate the values 548 and/or 550 accumulated based on transferring the connections data 526 and/or the location data 528. Yet, as noted, the values 548 and/or 550 may reflect values received based on use, possibly each time the entities 546 and/or 548 use the data 526 and/or 528, respectively. Further, the trust level 556 may indicate one or more levels of trust associated with the data entries 522-538 provided with the accounts 514, 516, and/or 518, and/or the entities 546 and/or 548. Yet further, the privacy level 558 may indication one or more levels of privacy associated the data entries 522-538 provided with the accounts 514, 516, and/or 518, and/or the entities 546 and/or 548.

As such, considering the scenarios of the more conservative user and the more experimental user, the report card 552 may facilitate user to help gauge their positions with the one or more arbitration models. For example, the more conservative user may have a lower balance 554 and higher levels of trust 556 and/or privacy 558. Yet further, the more experimental user may have a higher balance 554 and lower levels of trust 556 and/or privacy 558. In some embodiments, the operations may include generating the report card 552 associated with the personal information platform 512 based on the transfer of the data entries 526 and/or 528 to the one or more entities 546 and/or 548. The operations may also include causing the client device 502 to display the report card 552 such that the report card 552 displays a level of trust 556 associated with the transfer of the data entries 526 and/or 528 to the one or more entities 546 and/or 548.

Figure 6:
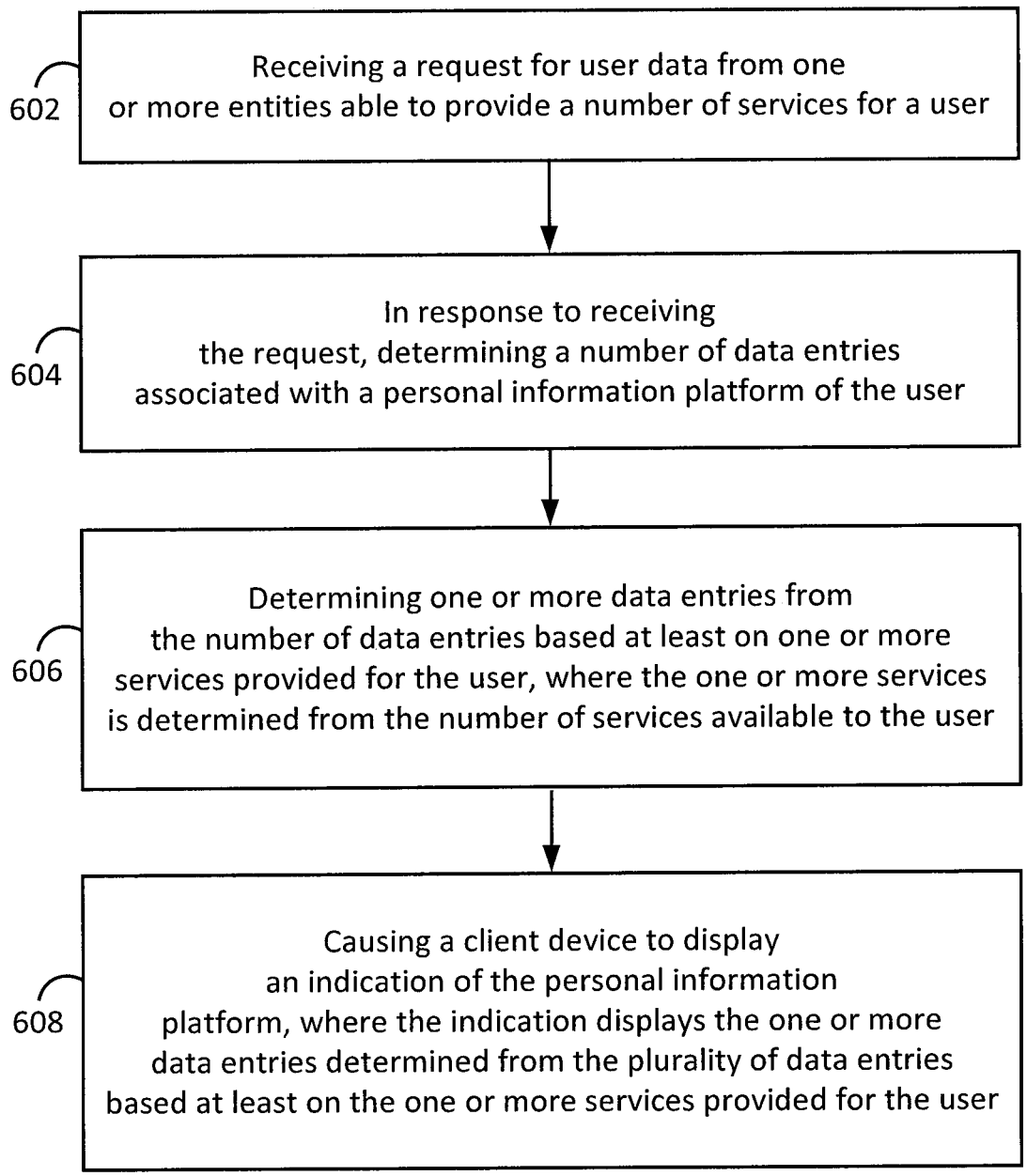
FIG. 6 illustrates an exemplary method, according to an embodiment.

FIG. 6 illustrates an exemplary method 600, respectively, according to an embodiment. Notably, one or more steps of the method 600 described herein may be omitted, performed in a different sequence, and/or combined with other methods for various types of applications contemplated herein.

As shown in FIG. 6, at step 602, the method 600 may include receiving a request for user data from one or more entities able to provide a number of services for a user. For example, referring back to FIGS. 5A and 5B, the request may be received in the form of the notifications 542 and/or 544. In particular, the one or more entities 546 and/or 548 may request for the user data, including the connections data 526 and/or the location data 528. Yet, for purposes of illustration, the one or more entities 546 and/or 548 may request for the data 522-538.

At step 604, in response to receiving the request, the method 600 may include determining a number of data entries associated with a personal information platform of the user. For example, the number of data entries 522-538 may be determined to be associated with the PIP 512 of the user.

At step 606, the method 600 may include determining one or more data entries from the number of data entries based at least on one or more services provided for the user, where the one or more services is determined from the number of services available to the user. For example, the one or more data entries, including the connections data 526 and/or the location data 528, may be determined from the data entries 522-538 based at least on one or more services provided for the user.

At step 608, the method 600 may include causing a client device to display an indication of the personal information platform, where the indication displays the one or more data entries determined from the number of data entries based at least on the one or more services provided for the user. For example, the indication of the PIP 512 may be displayed with the connections data 526 and/or the location data 528 determined from the data entries 522-538 based at least on the one or more services provided for the user.

Notably, in some instances, the user may request and/or select the one or more services from the number of services available to the user. As such, the method 600 may include determining the one or more data entries 526 and/or 528 is required by the one or more entities 546 and/or 548 to provide or carry out the one or more services requested and/or selected by the user. As such, the one or more entities 546 and/or 548 may include the minimum number of data entries, such as the connections data 526 and/or the location data 528, to carry out the one or more services. Thus, the one or more data entries 526 and/or 528 may be determined based at least on determining the one or more data entries 526 and/or 528 is required by the one or more entities 546 and/or 548.

In some embodiments, the indication of the PIP 512 may be displayed on the graphical user interface 504 of the client device 502 configured to receive one or more user inputs. As such, in some instances, the method 600 may further include determining accesses of the one or more entities 546 and/or 548. For example, referring back to FIG. 3 the accesses 330, 332, and/or 334 may be determined for entities, such as the one or more entities 546 and/or 548. As such, the one or more entities 546 and/or 548 may have such accesses to the one or more data entries 526 and/or 528, possibly based on the one or more user inputs to the GUI 504.

In some embodiments, the method 500 may include determining a value 550 for the data entry 528 from the one or more data entries 546 and/or 548 based at least on the one or more entities 546 and/or 548 interested in the data entry 528. In some instances, the indication of the PIP 512 may be displayed to further provide the value 550 for the data entry 528.

In some embodiments, the method 500 may include determining a second value for the data entry 528 based on one or more second entities interested in the one data entry 528. For example, there may be other (second) entities also interested in the location data 528. As such, the indication of the PIP 512 may be displayed to further provide the second value.

In some embodiments, the method 500 may include generating a portion of the report card 552 associated with the personal information platform 512 based on the value 550 for the data entry 528. Further, the method 500 may include causing the client device 502 to display the portion of the report card 552. In some instances, the report card indicates a level of trust 556 associated with a transfer of the data entry 528 to the one or more entities 548 for the value 550 determined.

Figure 7:
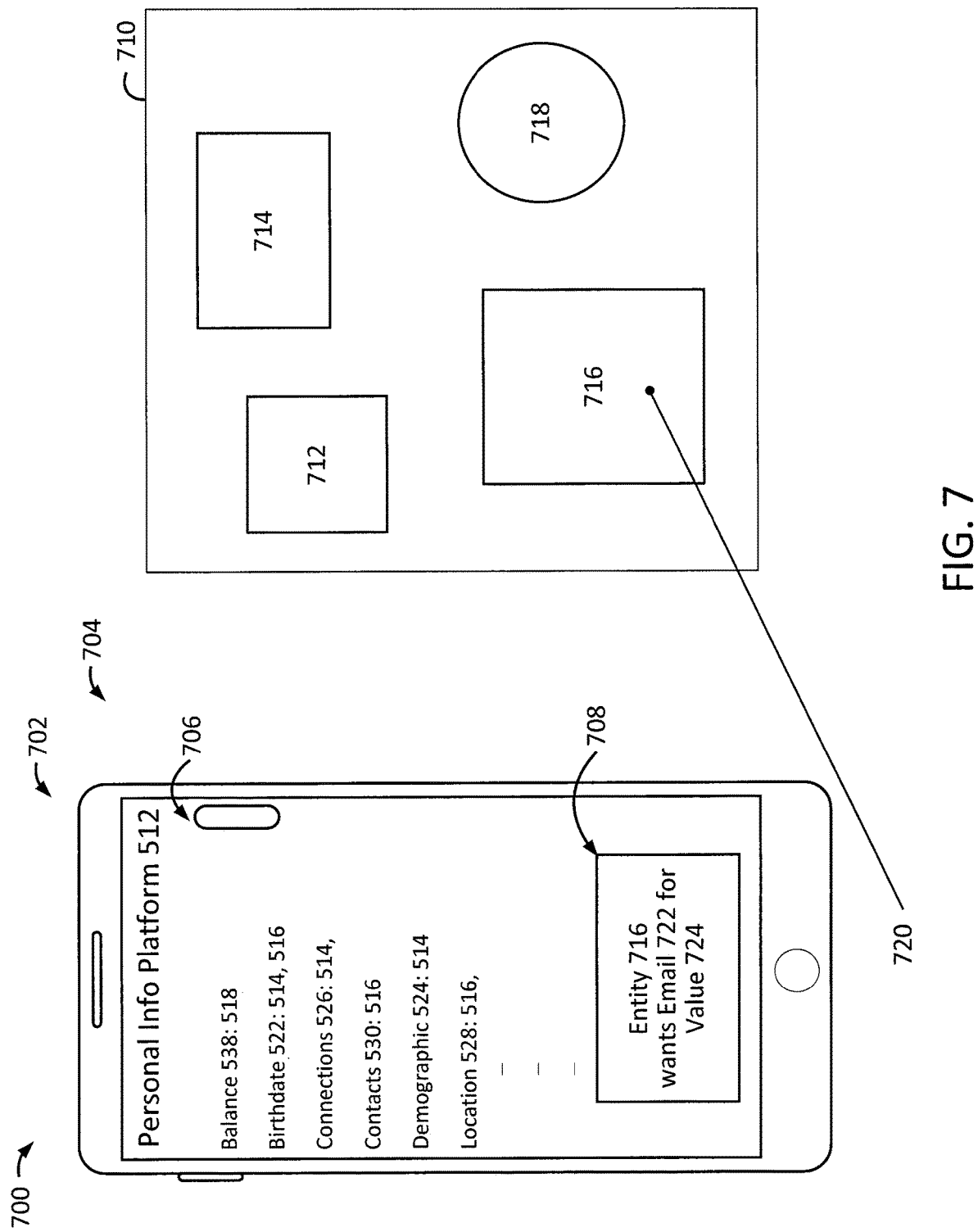
FIG. 7 illustrates an exemplary system with a client device, according to an embodiment.

FIG. 7 illustrates an exemplary system 700 with a client device 702, according to an embodiment. As shown, the client device 702 may take the form of the client device 402 and/or 502 described above in relation to FIGS. 4A-5B. For example, the client device 702 may include a graphical user interface (GUI) 704 that takes the form of the graphical user interface 404 and/or 504. Further, the GUI 704 may provide the PIP 512 described in relation to FIGS. 5A-6. Yet further, the GUI 704 may provide the data 522-538 and/or the accounts 514, 516, and/or 518.

As shown, the client device 702 may be in a location 720 shown on the geographical map 710, shown for illustrative purposes. For example, the client device 702 may be proximate to the entities 712, 714, 716, and/or 718 shown on the geographic map 720 as buildings or stores. In particular, the client device 702 may be at a location 720 within the building of the entity 716. In some instances, the one or more hardware processors (e.g., the processor 134) of the client device 702 may be configured to determine the location 730, possibly based on global positioning system (GPS) coordinates of the client device 702.

In some instances, the one or more hardware processors (e.g., processors 112 and/or 232) of the smartphone system 700 may determine the location 720 by retrieving data from the client device 702. For example, the location 720 may be determined by cellular protocol data, including GSM, CDMA, UMTS, EV-DO, WiMAX, or LTE data, and/or base station data, among other forms of data possibly available from the PIP 512. In addition, the location 720 may be further determined by sensor data, movement data (e.g., acceleration and/or velocity data) of the client device 702, temperature data, radio-frequency identifier (RFID) data, near-field communications (NFC) data, among other possible forms of data available from the PIP 512.

As also shown, the portion of the PIP 512 may provide a notification 708 that indicates the entity 716 wants the user's email 722 for a value 724. For example, the PIP 512 may provide the notification 708 based on a request received by the entity 716. Further, the PIP 512 may provide the notification 708 based on the user's location 720 being within the store of the entity 716, probably indicating the user's interest in the entity 716 and/or the services or products provided by the entity 716. As such, the user may accept the request in the notification 708 and the user's email 722 may be transferred to the entity 716 for the value 724.

In some instances, the notification 708 may be further customized. For example, the notification 708 may include customized alerts based on certain access thresholds and/or geographical locations. In particular, the alerts may be configured to indicate an entity from another country or region is requesting the user's email 722, e.g., someone in Africa or Europe is requesting to access the user's email 722. Further, the alerts may be configured such that entities located a given radius or a threshold radius from the location 720 may be blocked by the PIP 512 from making such requests. The customization may be provided by the PIP 512 and/or by the user through one or more control mechanisms of the GUI 704, such as user inputs to the GUI 704.

Figure 8:
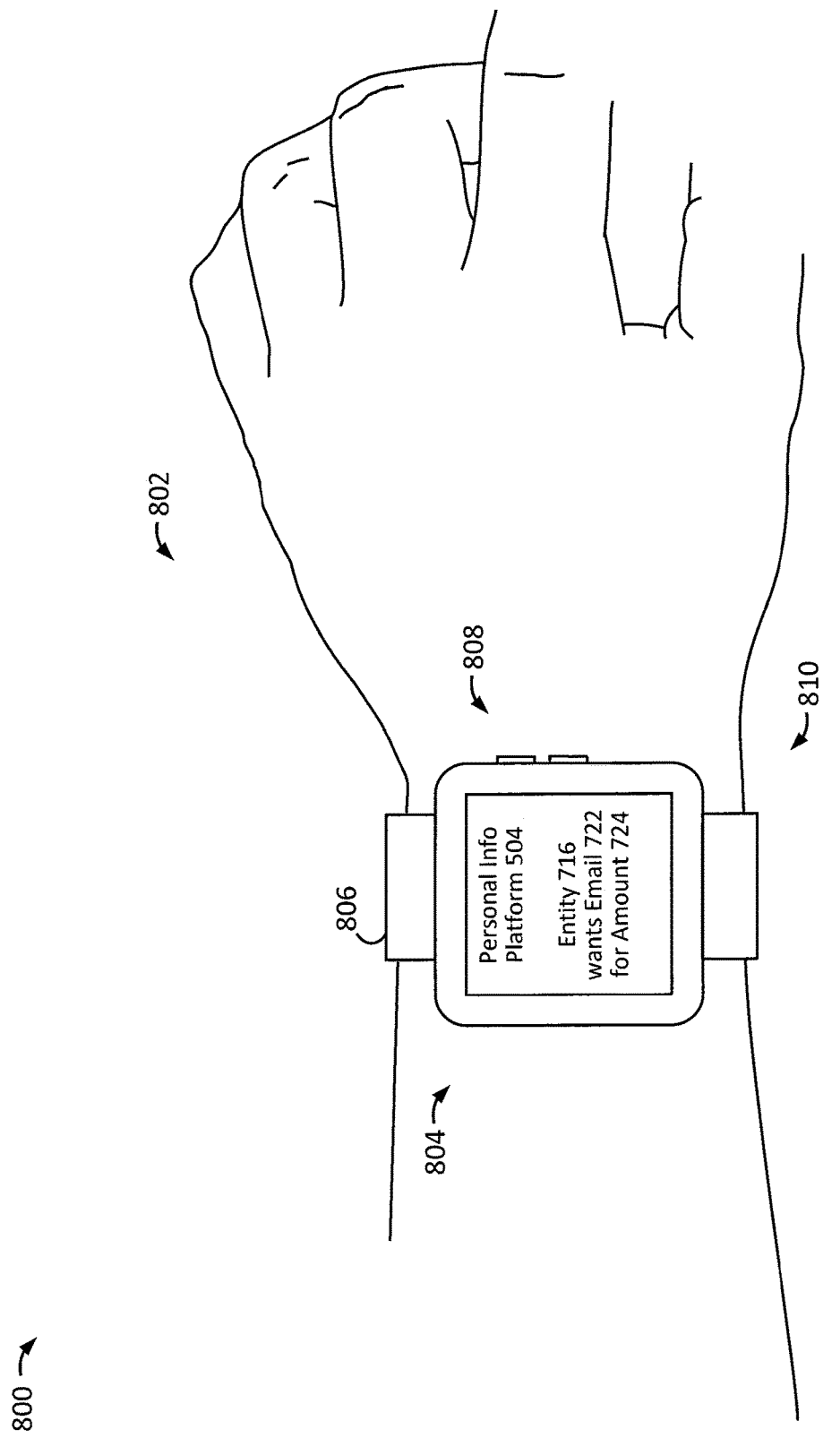
FIG. 8 illustrates an exemplary wearable computing device, according to an embodiment.

FIG. 8 illustrates an exemplary wearable computing device 800, according to an embodiment. As illustrated, the wearable computing device 800 may take the form of a smart watch. Further, the device 800 may include a graphical user interface (GUI) 804 that may include a smaller version of the GUIs 404 and/or 504. As shown, the GUI 804 may provide the personal information platform (PIP) 512 as described above. Further, the GUI 804 may provide a notification that, as noted above, indicates the entity 716 wants the user's email 722 for a value 724.

Further, the wearable computing device 800 may include a wrist band 806 that secures around a user's wrist 802. In addition, the wearable computing device 800 may include a number of buttons 808 configured to control the GUI 804 and/or sensors 810. The sensors 810, possibly located on the inside surfaces of the wrist band 806, may be configured to receive a number of inputs associated with the user. For example, the one or more sensors 810 may include accelerometers, gyroscopes, compasses, barometers, capacitive sensors, haptic sensors, temperature sensors, ambient light sensors, sound sensors, image sensors, biometric sensors, moisture sensors, electrodes, and/or chemical sampling sensors, among other types of sensors to receive inputs directly and/or indirectly from the user. As such, the PIP 504 may provide notifications from various entities based on detecting movements, activities, and/or various biometrics of the user.

The present disclosure, the accompanying figures, and the claims are not intended to limit the present disclosure to the example embodiments disclosed. As such, it is contemplated that various alternate embodiments and/or modifications to the embodiment disclosed, whether explicitly described or implied herein, are possible in light of the disclosure and/or the figures. Having thus described embodiments of the present disclosure, persons of ordinary skill in the art will recognize that changes may be made to the embodiments disclosed without departing from the scope of the present disclosure.

The invention claimed is:

1. A system, comprising:
a non-transitory memory; and
one or more hardware processors coupled to the non-transitory memory and configured to read instructions from the non-transitory memory to cause the system to perform operations comprising:
determining, based on a request from a first entity, a first access policy for providing data access to the first entity, wherein the first access policy specifies a set of data corresponding to a set of data types associated with a user to be accessible by the first entity;
analyzing a utilization by the first entity of data of a first data type;
determining that the data of the first data type is not required by the first entity for providing a service to the user based on the analyzing; and
in response to determining that the data of the first data type is not required by the first entity, modifying the first access policy to exclude data of the first data type from the set of data accessible by the first entity.

2. The system of claim 1, wherein the operations further comprise:
analyzing an interaction between the user and an interface provided by the first entity;
determining, based on the analyzing the interaction, that second data of a second data type is required by the first entity for providing the service to the user; and
in response to determining that the second data of the second data type is required by the first entity, modifying the first access policy to include the second data of the second data type in the set of data accessible by the first entity.

3. The system of claim 1, wherein the analyzing comprises accessing one or more websites associated with the first entity.

4. The system of claim 1, wherein the analyzing comprises monitoring user interactions between the user and one or more websites associated with the first entity.

5. The system of claim 1, wherein the operations further comprise:
presenting, on a user device of the user, a notification indicating that the data of the first data type is accessible by first entity but is not utilized by the first entity.

6. The system of claim 1, wherein the service provided by the first entity comprises at least one of an e-mail service, an electronic payment service, a social media service, or an item fulfillment service.

7. The system of claim 1, wherein the operations further comprise:
analyzing a utilization by the first entity of second data of the second data type associated with the user; and
determining a monetary value of the second data based on the analyzing the utilization by the first entity of the second data of the second data type.

8. A method, comprising:
- receiving, by one or more hardware processors, a request for accessing a set of data corresponding to a set of data types associated with a user by a first entity;
- determining, by the one or more hardware processors, a first access policy for providing data access to the first entity, wherein the first access policy specifies a set of data corresponding to a set of data types associated with a user to be accessible by the first entity;
- analyzing, by the one or more hardware processors, a utilization by the first entity of the set of data; and
- modifying, by the one or more hardware processors, the first access policy for the first entity based on the analyzing.

9. The method of claim 8, wherein the modifying comprises removing a subset of data from the set of data to be accessible by the first entity.

10. The method of claim 8, wherein the modifying comprises adding data corresponding to a data type not included in the set of data types to the set of data to be accessible by the first entity.

11. The method of claim 8, wherein the analyzing comprises accessing one or more websites associated with the first entity.

12. The method of claim 8, wherein the analyzing comprises monitoring user interactions between the user and one or more websites associated with the first entity.

13. The method of claim 8, further comprising:
- receiving, from a user device associated with the user, one or more inputs indicating a change of the first access policy, wherein the modifying the first access policy is further based on the one or more inputs.

14. The method of claim 8, further comprise:
- presenting, on a user device associated with the user, a report indicating one or more data accesses of the first entity to the set of data.

15. A non-transitory machine-readable medium having stored thereon machine-readable instructions executable to cause a machine to perform operations comprising:
- determining, based on a request from a first entity, a first access policy for providing data access to the first entity, wherein the first access policy specifies a set of data corresponding to a set of data types associated with a user to be accessible by the first entity;
- analyzing a utilization by the first entity of data of at least a first data type in the set of data types for providing a service to the user; and
- modifying the first access policy based on the analyzing.

16. The non-transitory machine-readable medium of claim 15, wherein the operations further comprise:
- determining a plurality of rules associated with third-party access of data of a first data type, wherein the modifying the first access policy is further based on the plurality of rules and comprises a restriction of access to the data of the first data type by the first entity.

17. The non-transitory machine-readable medium of claim 15, wherein the operations further comprise:
- determining a second access policy for providing data access to a second entity, wherein the second access policy specifies a second set of data corresponding to a second set of data types associated with a user to be accessible by the second entity;
- analyzing a utilization by the second entity of data of a second data type in the second set of data types; and
- modifying the second access policy based on the analyzing the utilization by the second entity of data of the second data type.

18. The non-transitory machine-readable medium of claim 15, wherein the operations further comprise:
- monitoring data access by the first entity to the set of data; and
- presenting, on a user device associated with the user, a report indicating one or more data accesses of the first entity to the set of data based on the monitoring.

19. The non-transitory machine-readable medium of claim 15, wherein the modifying comprises removing the data of the first data type from the set of data to be accessible by the first entity.

20. The non-transitory machine-readable medium of claim 15, wherein the modifying comprises adding data corresponding to a data type not included in the set of data types to the set of data to be accessible by the first entity.

* * * * *